US010698591B2

(12) United States Patent
Masterson et al.

(10) Patent No.: US 10,698,591 B2
(45) Date of Patent: Jun. 30, 2020

(54) IMMERSIVE DOCUMENT INTERACTION WITH DEVICE-AWARE SCALING

(71) Applicant: Microsoft Technology Licensing, LLC, Redmond, WA (US)

(72) Inventors: Joseph Masterson, Maple Valley, WA (US); Jeremy de Souza, Bellevue, WA (US); Jin Ma, Redmond, WA (US); Elena Catrinescu, Woodinville, WA (US); Nathan Waddoups, Redmond, WA (US); Kenneth Fern, Bellevue, WA (US); David Lloyd Meyers, Jr., Seattle, WA (US); David Paul Limont, Seattle, WA (US); Michael B. Palmer, Edmonds, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/461,275

(22) Filed: Aug. 15, 2014

(65) Prior Publication Data

US 2015/0277722 A1    Oct. 1, 2015

Related U.S. Application Data

(60) Provisional application No. 61/973,111, filed on Mar. 31, 2014.

(51) Int. Cl.
*G06Q 10/10* (2012.01)
*G06F 3/048* (2013.01)
(Continued)

(52) U.S. Cl.
CPC .......... *G06F 3/04847* (2013.01); *G06F 3/048* (2013.01); *G06F 3/04842* (2013.01);
(Continued)

(58) Field of Classification Search
CPC .......... G06F 17/00; G06F 17/21; G06F 17/24; G06F 3/01; G06F 3/048; G06F 3/1407;
(Continued)

(56) References Cited

U.S. PATENT DOCUMENTS 5,046,001 A   9/1991  Barker et al.
5,818,447 A   10/1998 Wolf et al.
(Continued)

FOREIGN PATENT DOCUMENTS

CN   1755680 A   4/2006
CN   1770184 A   5/2006
(Continued)

OTHER PUBLICATIONS

"Second Written Opinion Issued in PCT Application No. PCT/US2015/022609", dated Feb. 19, 2016, 7 Pages.
(Continued)

*Primary Examiner* — Li P Sun
*Assistant Examiner* — Qi Wan

(57) ABSTRACT

An adaptive layout and workflow engine. The adaptive layout and workflow engine allows various applications to dynamically render scaled views of content based on the characteristics of the display on the device being used to consume the content. The adaptive layout and workflow engine may select an appropriate view of the content to render based on the size, resolution, or aspect ratio of the display. The rendered size of the content and/or the user interface of the content application is evaluated relative to the characteristics of the display. Embodiments may provide different controls via the user interfaces based on the characteristics of the display and/or content. The adaptive layout and workflow engine may provide customized work flows
(Continued)

via the user interface to improve the user experience depending on the display capabilities of the device used to consume the content.

20 Claims, 21 Drawing Sheets

(51) Int. Cl.
  *G06F 3/0484* (2013.01)
  *H04L 29/08* (2006.01)
(52) U.S. Cl.
  CPC ......... *G06Q 10/10* (2013.01); *H04L 67/2823* (2013.01); *G06F 2203/04803* (2013.01)
(58) Field of Classification Search
  CPC ......... H04L 67/04; H04L 67/22; G06Q 10/00; G06Q 10/107; G06Q 30/00
  See application file for complete search history.

(56) References Cited

U.S. PATENT DOCUMENTS

| | | | |
|---|---|---|---|
| 6,023,714 A * | 2/2000 | Hill | G06F 17/211 715/235 |
| 6,134,566 A | 10/2000 | Berman et al. | |
| 7,243,298 B2 | 7/2007 | Yozell-Epstein et al. | |
| 7,424,676 B1 | 9/2008 | Carlson et al. | |
| 7,730,146 B1 | 6/2010 | Mace et al. | |
| 7,769,144 B2 | 8/2010 | Yao et al. | |
| 8,108,464 B1 | 1/2012 | Rochelle et al. | |
| 8,122,364 B2 | 2/2012 | Yozell et al. | |
| 8,140,975 B2 | 3/2012 | Lemay et al. | |
| 8,185,591 B1 | 5/2012 | Lewis | |
| 8,434,021 B2 | 4/2013 | Mullender et al. | |
| 8,443,282 B2 * | 5/2013 | Kikuchi | G06F 17/248 715/243 |
| 8,682,989 B2 | 3/2014 | Meisels et al. | |
| 2002/0059347 A1 * | 5/2002 | Shaffer | G06F 9/445 715/210 |
| 2002/0188524 A1 * | 12/2002 | Shimizu | G06Q 30/06 705/26.81 |
| 2004/0267871 A1 | 12/2004 | Pratley et al. | |
| 2005/0012723 A1 * | 1/2005 | Pallakoff | G06F 1/1616 345/173 |
| 2005/0038863 A1 | 2/2005 | Onyon et al. | |
| 2005/0216841 A1 | 9/2005 | Acker et al. | |
| 2006/0056604 A1 * | 3/2006 | Sylthe | H04L 67/04 379/100.13 |
| 2006/0075046 A1 * | 4/2006 | Yozell-Epstein | G06Q 10/107 709/206 |
| 2006/0156240 A1 | 7/2006 | Lemay et al. | |
| 2006/0224937 A1 * | 10/2006 | Sudoh | G06F 3/048 715/201 |
| 2006/0227153 A1 | 10/2006 | Anwar | |
| 2006/0294476 A1 | 12/2006 | Buckley | |
| 2007/0186186 A1 | 8/2007 | Both et al. | |
| 2007/0233791 A1 | 10/2007 | Sylthe et al. | |
| 2007/0234239 A1 * | 10/2007 | Sylthe | G06F 3/1407 715/864 |
| 2007/0239831 A1 | 10/2007 | Basu | |
| 2008/0005149 A1 * | 1/2008 | McAfee | G06F 17/30126 |
| 2008/0046518 A1 | 2/2008 | Tonnison et al. | |
| 2008/0104515 A1 | 5/2008 | Dumitru et al. | |
| 2008/0189647 A1 | 8/2008 | Tapuska | |
| 2008/0208963 A1 | 8/2008 | Eyal et al. | |
| 2008/0313177 A1 | 12/2008 | Li et al. | |
| 2009/0083646 A1 | 3/2009 | Lin et al. | |
| 2009/0150769 A1 | 6/2009 | Konnola | |
| 2010/0125646 A1 * | 5/2010 | Wettenstein | G06F 9/44584 709/219 |
| 2010/0215108 A1 | 8/2010 | Cooperman | |
| 2010/0216108 A1 | 8/2010 | Cooperman et al. | |
| 2010/0217645 A1 | 8/2010 | Jin et al. | |
| 2010/0223542 A1 | 9/2010 | Vuong et al. | |
| 2011/0032273 A1 * | 2/2011 | Sylthe | G06F 3/1407 345/660 |
| 2011/0163969 A1 | 6/2011 | Anzures | |
| 2011/0276897 A1 | 11/2011 | Crevier et al. | |
| 2011/0320964 A1 | 12/2011 | Gambhir et al. | |
| 2012/0011196 A1 | 1/2012 | Green et al. | |
| 2012/0026541 A1 * | 2/2012 | Kobayashi | G06F 3/1208 358/1.15 |
| 2012/0144331 A1 | 6/2012 | Tolonen | |
| 2012/0191577 A1 | 7/2012 | Gonsalves et al. | |
| 2012/0204125 A1 | 8/2012 | Shia et al. | |
| 2012/0284639 A1 * | 11/2012 | Yuniardi | G06Q 10/00 715/752 |
| 2012/0297463 A1 * | 11/2012 | Orbach | G06Q 10/107 726/4 |
| 2013/0007592 A1 | 1/2013 | Dougherty | |
| 2013/0021377 A1 | 1/2013 | Doll | |
| 2013/0046869 A1 * | 2/2013 | Jenkins | H04L 67/22 709/223 |
| 2013/0076591 A1 | 3/2013 | Sirpal et al. | |
| 2013/0097488 A1 | 4/2013 | Coman et al. | |
| 2013/0117376 A1 | 5/2013 | Filman et al. | |
| 2013/0125050 A1 | 5/2013 | Goshey | |
| 2013/0159082 A1 | 6/2013 | Abbott et al. | |
| 2013/0174049 A1 * | 7/2013 | Townsend | G06F 3/0481 715/748 |
| 2013/0187861 A1 | 7/2013 | Lavallee | |
| 2013/0222231 A1 | 8/2013 | Gardenfors et al. | |
| 2013/0226577 A1 | 8/2013 | Shmunis et al. | |
| 2013/0227398 A1 | 8/2013 | Bolstad | |
| 2013/0318448 A1 | 11/2013 | O'Shaugnessy et al. | |
| 2013/0325980 A1 * | 12/2013 | Ohayon | H04L 51/066 709/206 |
| 2013/0326331 A1 | 12/2013 | DeLuca et al. | |
| 2013/0332850 A1 | 12/2013 | Bovet et al. | |
| 2013/0332881 A1 * | 12/2013 | Yook | G06F 3/0481 715/781 |
| 2014/0053065 A1 * | 2/2014 | Yun | G06F 17/30905 715/238 |
| 2014/0068501 A1 | 3/2014 | Wu et al. | |
| 2014/0208203 A1 * | 7/2014 | Tang | G06F 17/217 715/252 |
| 2014/0223291 A1 | 8/2014 | Sharma | |
| 2014/0248857 A1 | 9/2014 | Huang et al. | |
| 2014/0359656 A1 | 12/2014 | Banica et al. | |
| 2015/0019942 A1 | 1/2015 | Choi et al. | |
| 2015/0277711 A1 | 1/2015 | Masterson et al. | |
| 2015/0149882 A1 * | 5/2015 | Hsu | G06F 17/241 715/230 |
| 2015/0278234 A1 | 10/2015 | Masterson et al. | |
| 2015/0281148 A1 | 10/2015 | Masterson et al. | |

FOREIGN PATENT DOCUMENTS

| | | |
|---|---|---|
| CN | 102067107 A | 5/2011 |
| CN | 102253836 A | 11/2011 |
| CN | 102591568 A | 7/2012 |
| CN | 103051669 A | 4/2013 |
| CN | 103261994 A | 8/2013 |
| EP | 2618246 A1 | 7/2013 |
| JP | 2001312440 A | 11/2003 |
| JP | 2006107443 A | 4/2006 |
| JP | 2007157108 A | 6/2007 |
| RU | 2481622 C2 | 5/2013 |
| WO | 2013067073 A1 | 5/2013 |

OTHER PUBLICATIONS

"Different Screen Sizes", Published on: Jan. 30, 2013, Available at: https://developer.blackberry.com/design/bb10/screen_sizes.html.
Daniel P. Howley, "How to Use Split Screen Mode in Windows 8.1", Published on: Jun. 27, 2013, Available at: http://blog.laptopmag.com/use-split-screen-mode-windows-81.
Steven Sinofsky, "Scaling to different screens", Published on: Mar. 22, 2012, Available at: http://blogs.msdn.com/b/b8/archive/2012/03/21/scaling-to-different-screens.aspx.

(56) References Cited

OTHER PUBLICATIONS

"Supporting Multiple Screens", Retrieved on: Mar. 25, 2014, Available at: http://developer.android.com/guide/practices/screens_support.html.
"Second Written Opinion Issued in PCT Application No. PCT/US2015/022607", dated Nov. 9, 2015, 6 Pages.
"Turn Your Inbox into a Document Management Tool", Published on: Mar. 22, 2004, Available at: http://dokdok.com/.
"MessageContext: See the Whole Conversation When Dealing with Messages", Published on: May 12, 2006, Available at: http://www.clearcontext.com/user_guide/relatedview.html.
Thurroti, Paul, "Windows 8.1 Tip: Master Auto-Snap", Published on: Sep. 22, 2013, Available at: http://winsupersite.com/windows-8/windows-81-tip-master-auto-snap.
"The DokDok API is now Context.IQ", Relieved on: Mar. 24, 2014 Available at: http://dokdok.com/.
"International Search Report and Written Opinion Issued in PCT Patent Application No. PCT/US2015/022609", dated Jun. 17, 2015, 12 Pages.
Gamma, et al., "Chapter 5: Behavioral Patterns", A Design Patterns Passage, Oct. 21, 1994, p. 293, 294, 297, 300, 301.
PowerPoint 2010: Animating Text and Objects, downloaded from <http://www.gcflearnfree.org/print/powerpoint2010/animating-text-and-objects1?playlist=PowerPoint_2010>, describes features in Microsoft PowerPoint 2010, and thus the described features were published or made public by 2010. 9 pages.
Outlook 2010 Organizing Email, presentation given by Lynn Mann on YouTube, published Oct. 1, 2013, downloaded at <https://youtu.be/Rljxj0KtXP4> 2 pages.
Flickr app for iPhone, uploaded by Jane Jones, published on May 2013, downloaded from YouTube at < https://www.youtube.com/watch?v=9HsMaF5QrTM> 2 pages.
R. Tamada, "Android Sliding Menu using Navigation Drawer," published Nov. 13, 2013, downloaded from <http://www.androidhive.info/2013/11/android-sliding-menu-using-navigation-drawer/>; embedded on p. 2 is the YouTube video, "Android Sliding Menu using Navigation Drawer (Demo)" published Nov. 12, 2013, downloaded from <https://www.youtube.com/watch?v=aVIG9SWGvdQ&feature=youtu.be> 29 pages.
PCT International Preliminary Report on Patentability Issued in Application No. PCT/US2015/022609, dated Jun. 14, 2016, 16 Pages.
M. Langer, "Microsoft Outlook for Mac 2011 Step by Step", published Apr. 15, 2011.
Ye, T., "Responsive HTML Emails: a Different Strategy," Fog Creek, published Nov. 1, 2013 as indicated on first page, downloaded from: https://blog.fogcreek.com/responsive-html-emails-a-different-strategy/, 15 pages.
"Office Action Issued in Chinese Patent Application No. 201580018252", dated Aug. 31, 2018, 11 Pages.
"Office Action Issued in Chinese Patent Application No. 201580018275", dated Sep. 4, 2018, 10 Pages.
"Office Action Issued in Russian Patent Application No. 2016138534", dated Oct. 18, 2018, 8 Pages.
"Non Final Office Action Issued in U.S. Appl. No. 14/497,236", dated Nov. 16, 2018, 28 Pages.
"Office Action Issued in European Patent Application No. 15719882.1", dated Dec. 6, 2018, 8 Pages.
Johnson, Chris, "Handy Outlook Web Access 2013 Tips", Retrieved From: https://www.chrisjohnson.io/2013/05/23/handy-outlook-web-access-2013-tips/, May 23, 2013, 5 Pages.
Knowlton, Gray, "The New Outlook Web App Extends to Tablets and Phones", Retrieved From: https://www.microsoft.com/en-us/microsoft-365/blog/2012/08/02/the-new-outLook-web-app-extends-to-tablets-and-phones/, Aug. 2, 2012, 14 Pages.
"Customize the Outlook Window", Retrieved from https://support.office.com/en-us/article/Customize-the-Outlook-window-b3eb6e2f-727e-4fba-aaa2-1eb057cca45f, Jun. 14, 2016, 5 Pages.
"Final Office Action Issued in U.S. Appl. No. 14/460,968", dated Jun. 6, 2018, 15 Pages.
"Final Office Action Issued in U.S. Appl. No. 14/460,968", dated Aug. 25, 2016, 15 Pages.
"Non-Final Office Action Issued in U.S. Appl. No. 14/460,968", dated Jul. 11, 2017, 15 Pages.
"Non-Final Office Action Issued in U.S. Appl. No. 14/460,968", dated Dec. 7, 2017, 15 Pages.
"Non-Final Office Action Issued in U.S. Appl. No. 14/460,968", dated Apr. 21, 2016, 13 Pages.
"Final Office Action Issued in U.S. Appl. No. 14/497,236", dated Jun. 5, 2018, 33 Pages.
"Final Office Action Issued in U.S. Appl. No. 14/497,236", dated Apr. 6, 2017, 29 Pages.
"Non Final Office Action Issued in U.S. Appl. No. 14/497,236", dated Jul. 25, 2016, 31 Pages.
"Non-Final Office Action Issued in U.S. Appl. No. 14/497,236", dated Jan. 12, 2018, 30 Pages.
"Final Office Action Issued in U.S. Appl. No. 14/497,254", dated Jan. 11, 2017, 28 Pages.
"Non Final Office Action Issued in U.S. Appl. No. 14/497,254", dated Jul. 15, 2016, 29 Pages.
Boyce, Jim, "Microsoft Outlook 2013 Inside Out", Published by Microsoft Press, Jul. 15, 2013, 30 Pages.
Glenn, Walter, "How to Use Microsoft Windows XP", Published by Que, Oct. 16, 2002, 9 Pages.
Habraken, Joe, "Office 2013 in Depth", Published by Que, Mar. 22, 2013, 11 Pages.
M. Trauschold, "Iphone 4S Made Simple", Published by Apress, Edition 632, Dec. 16, 2011, 21 pages.
"International Preliminary Report on Patentability Issued in PCT Application No. PCT/US2015/022606", dated Apr. 7, 2016, 7 Pages.
"International Search Report and Written Opinion Issued in PCT Application No. PCT/US2015/022606", dated Jun. 29, 2015, 10 Pages.
"Second Written Opinion Issued in PCT Application No. PCT/US2015/022606", dated Dec. 4, 2015, 6 Pages.
"International Preliminary Report on Patentability Issued in PCT Application No. PCT/US2015/022607", dated Apr. 7, 2016, 07 Pages.
"International Search Report & Written Opinion Received for PCT Patent Application No. PCT/US2015/022607", dated Jun. 29, 2015, 11 Pages.
Supporting Multiple Screens, Retrieved from https://web.archive.org/web/20120708234854/https://developer.android.com/guide/practices/screens_support.html, Jul. 8, 2012, 18 Pages.
"First Office Action & Search Report Issued in Chinese Patent Application No. 201580018354.1", dated Feb. 2, 2019, 13 Pages.
"Office Action Issued in European Patent Application No. 15715089.7", dated Jan. 9, 2019, 2 Pages.
Gamma, E, et al., "Design Patterns, Passage", Published by Pearson Education India, Addison-Wesley Professional Computing series, Oct. 21, 1994, pp. 293.
"Final Office Action Issued in U.S. Appl. No. 14/497,236", dated Mar. 27, 2019, 31 Pages.
Kalli, Andrea, "Remove Big Attachments, But Keep the Email in Outlook", Retrieved From: https://www.youtube.com/watch?v=4cmvzxg6d7A, Sep. 8, 2008, 3 Pages.
"Non Final Office Action Issued in U.S. Appl. No. 14/460,968", dated May 31, 2019, 17 Pages.
"Second Office Action Issued in Chinese Patent Application No. 201580018354.1", dated Aug. 15, 2019, 10 Pages.
"Final Office Action Issued in U.S. Appl. No. 14/460,968", dated Oct. 31, 2019, 18 Pages.
"Full Examination Report Issued in Australian Patent Application No. 2015241283", dated Dec. 3, 2019, 5 Pages.
"Office Action Issued in European Patent Application No. 15716275.1", dated Feb. 10, 2020, 05 Pages.
Corrigan, et al., "Inside the digital Ecosystem—Capitalizing on Connectivity", in Journal of Sigma, vol. 11, No. 1, Oct., 2011, 56 Pages.

* cited by examiner

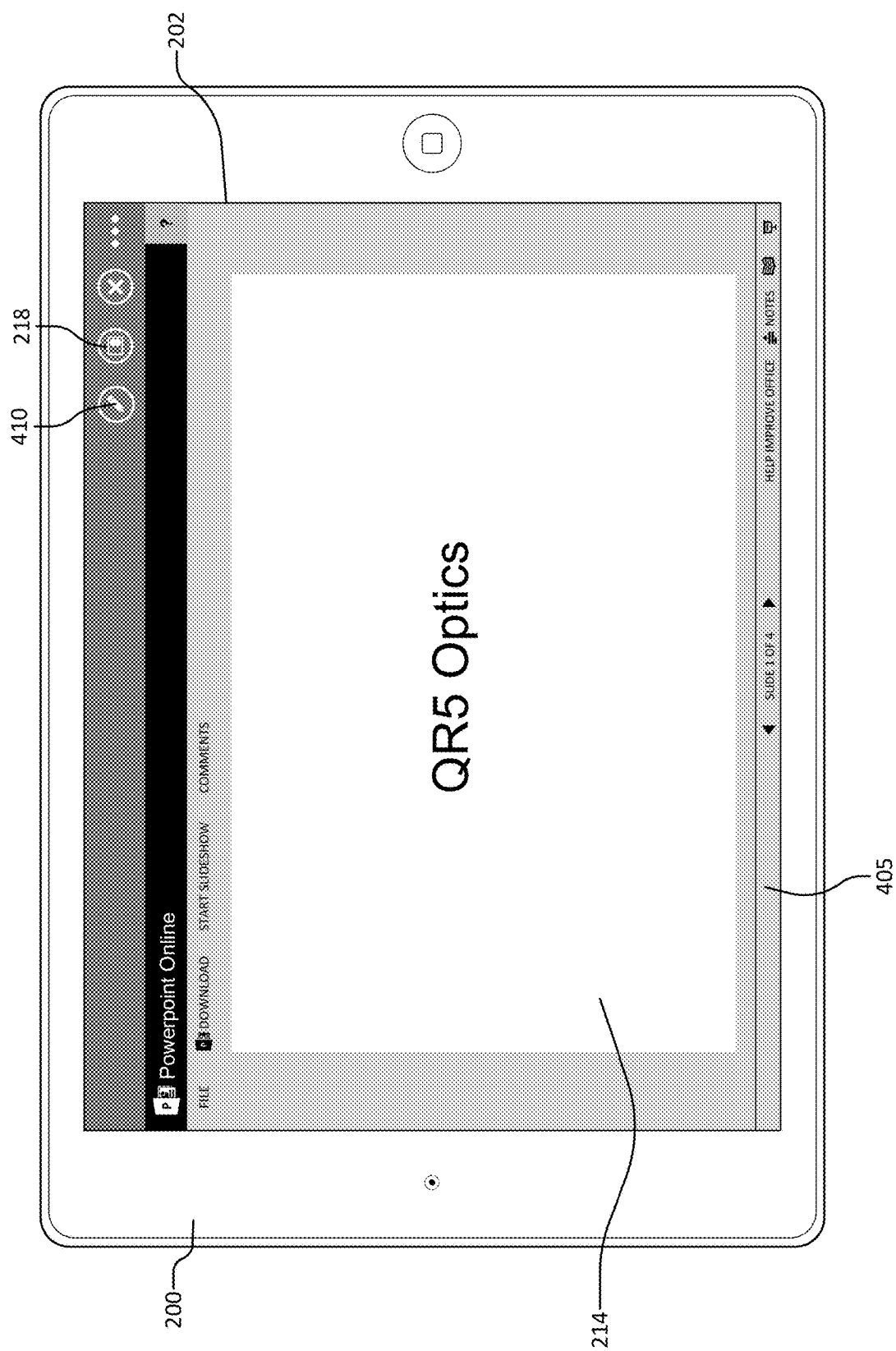

IMMERSIVE DOCUMENT INTERACTION WITH DEVICE-AWARE SCALING

RELATED APPLICATIONS

This application claims the benefit of U.S. Provisional Application No. 61/973,111, filed Mar. 31, 2014, the disclosure of which is hereby incorporated by reference in its entirety.

BACKGROUND

Users frequently work with multiple forms of content, such as email and documents, to communicate relevant information. Many tasks involve using both forms of content together. Conventional solutions generally treat the two forms of content as separate items requiring manual, and often inefficient, manipulation of the items and/or the information contained therein together to complete the task. For example, in a conventional work flow to edit an email attachment and return it to the sender, the user must download the attachment, perform the edits using the appropriate software application, compose a new email message, locate and attach the edited attachment to the new email message, and send the new email message. Efficiency varies depending on the device being used to complete the workflow due to differences in the capabilities, such as display capabilities, of different devices.

It is with respect to these and other considerations that the present invention has been made. Although relatively specific problems have been discussed, it should be understood that the aspects disclosed herein should not be limited to solving the specific problems identified in the background.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Aspects of a system for immersive document interaction with device-aware scaling include an adaptive layout and workflow engine to dynamically render scaled views of content based on the display capabilities/configuration of the device being used to consume the content. The adaptive layout and workflow engine is in communication with one or more applications used to view, generate, and edit content items. The content provided by the applications may include compound content. Compound content includes a primary content item (i.e., a container) carrying, or otherwise associated with, one or more attached or embedded content items (i.e., attachments). When a user interacts with an attachment using an application associated with the system, the adaptive layout and workflow engine collects information about the device requesting the attachment. Based on the display capabilities, for example, the aspect ratio of the device, the adaptive layout and workflow engine selects a default layout for presenting the attachment to the user.

Devices with constrained displays, such as having small aspect ratios and/or small physical sizes, may not be well suited for simultaneously displaying the attachment and the container. In such cases, the default layout automatically selected by the adaptive layout and workflow engine may be a full screen layout presenting only the attachment. Other layouts may be available to be manually selected by the user, such as, but not limited to, a side-by-side layout and other multiple region layouts. On the other hand, for devices with more generous display capabilities, such as large aspect ratios, multiple displays, and/or large physical displays, the default layout automatically selected by the adaptive layout and workflow engine may be a side-by-side layout and other multiple region layouts may be considered suitable for simultaneously displaying the attachment and the container.

The adaptive layout and workflow engine may also provide adaptive workflows via the user interface based on the display capabilities of the device used to consume the content, and, optionally, the nature of the content and/or the actions taken by the user. The adaptive workflows provide context-sensitive task controls that allow the user to perform sequences of actions incorporating information from the compound content in ways that minimize limitations resulting from constrained displays. The context-sensitive task controls initiate task sequences that allow the user to focus on substantively working with the content rather than logistically managing the individual content items and switching between various applications to initiate multiple actions (e.g., load, save, edit, create, reply, or send) involved in completing the substantive task, which may be especially inefficient or unnecessarily complicated or difficult on devices with constrained displays.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views:

FIGS. 4A-4F illustrate aspects of a user interface implementing a customized workflow implemented by the system to provide the user with an immersive interactive experience that lets the user focus on performing substantive work instead trying to navigate through the ministerial functions associated with the task on the device with the width constrained display;

DETAILED DESCRIPTION

Various aspects of the invention are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems, or devices. Accordingly, embodiments may take the form of a hardware implementation, an entirely software implementation or an implementation combining software and hardware aspects. The following detailed description is, therefore, not to be taken in a limiting sense.

Aspects of a system for immersive document interaction with device-aware scaling are described herein and illustrated in the accompanying figures. The system includes an adaptive layout and workflow engine to dynamically render scaled views of content based on the display capabilities/configuration of the device being used to consume the content. The system may select an appropriate view of the content to render based on the size, resolution, or aspect ratio of the display. The rendered size of the content and/or the user interface of the content application may be evaluated relative to the display capabilities. Embodiments may provide different controls via the user interface based on the type of device, the display capabilities, and/or the task context. The system may also provide customized work flows via the user interface to improve the user experience depending on the type of device, the display capabilities, and/or the task context.

Figure 1:
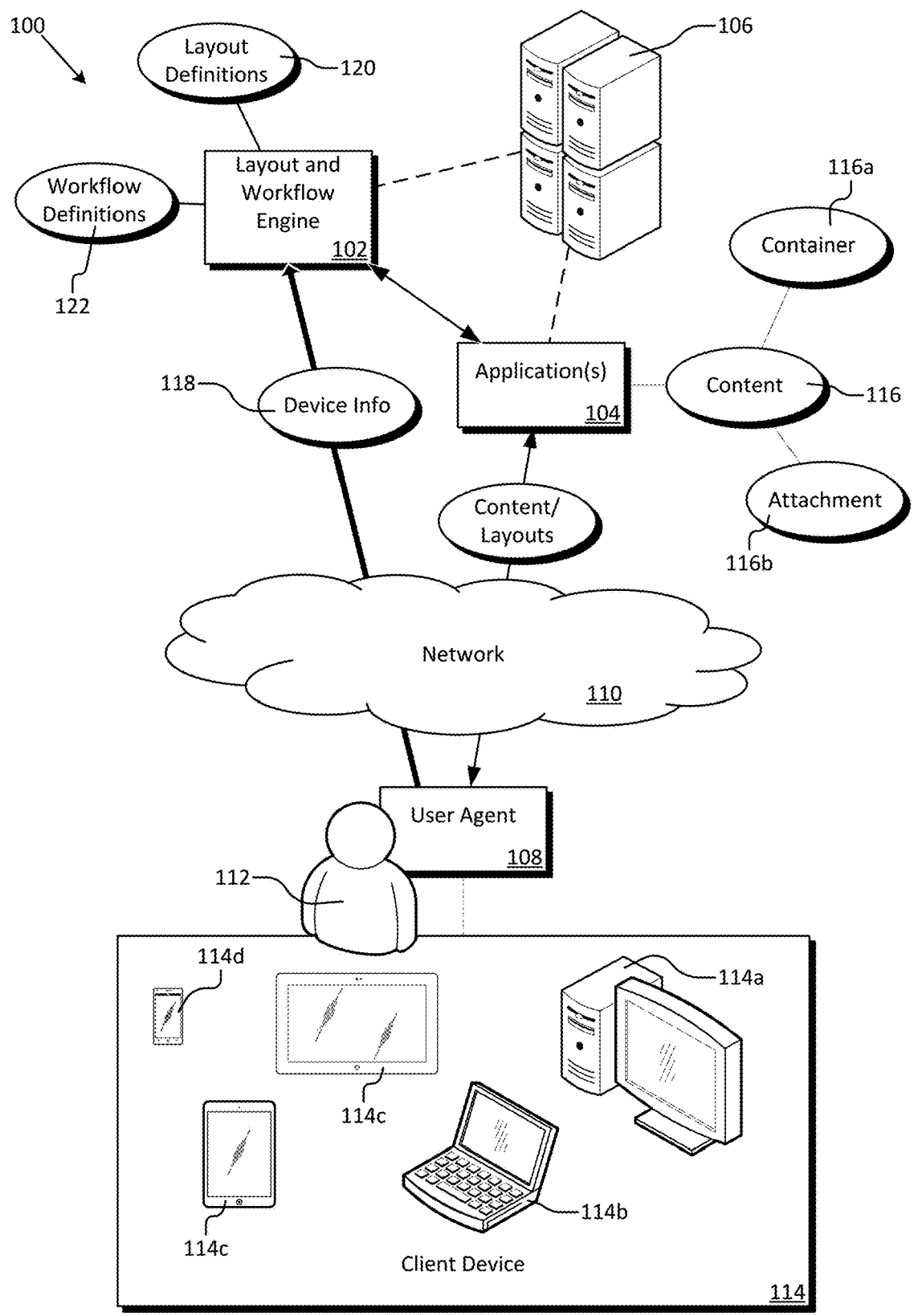
FIG. 1 is a system diagram illustrating aspects of a system for immersive document interaction with device-aware scaling.

FIG. 1 is a system diagram illustrating aspects of a system for immersive document interaction with device-aware scaling. The system 100 includes an aspect ratio aware layout and workflow engine 102 in communication with one or more applications 104 used to view, generate, and edit content items. Examples of suitable applications include, but are not limited to, word processing, spreadsheet, database, slide presentation, electronic mail, drawing, web browser, media player, and game applications.

In the illustrated embodiment, the system is a distributed system operating in a network computing environment. In the distributed system, the adaptive layout and workflow engine 102 and/or the application(s) 104 may run on a server 106 and communicate with a user agent 108 via a network 110, such as, but not limited to, the Internet, an intranet, a local area network, or a wide area network. The user agent provides a user interface that allows a user 112 to interact with the content provided by the applications 104. The user interface is displayed on a display of a client device 114 running the user agent.

The server and client device may be computing devices, such as, but not limited to, server or desktop computers 114a, laptops 114b, tablet computers 114c, smartphones 114d, smart watches, and smart appliances. In the distributed system, the applications serving the content to the user agent may not be aware of the display capabilities of the client device being used to interface with the content. One non-limiting example of a distributed system is a web-based office application suite that provides communication using email or other messaging technologies (e.g., instant messaging or texting) and viewing/editing of multiple office application document types.

The content 116 provided by the applications may include compound content. Compound content includes a primary content item 116a carrying, or otherwise associated with, one or more attached or embedded content items 116b. For convenience, the primary content item may be referred to as the container 116a and attached or embedded content may be referred to as attachments 116b. A common example of compound content is email messages (containers) with attached documents (attachments). Other examples of compound content include presentations, spreadsheets, word processing documents, and fixed format documents (containers) with other linked or embedded documents, media files, or content snippets separately viewable or editable using another application.

When a user interacts with an attachment using an application associated with the system, the adaptive layout and workflow engine collects information 118 about the device requesting the attachment. In the distributed embodiment of the system, users may access the applications from different client devices at various times. For example, a user may access the applications from a desktop computer while in the office at work, a laptop computer from home, and a tablet or smartphone from most anywhere else. Accordingly, the adaptive layout and workflow engine may collect information each time a request for an attachment is made, on periodic basis, or only at the first attachment request of a single continuous session for a particular user.

Information may be requested by a wide variety of techniques including, but not limited to, calls to an application programming interface (API) provided by the operating system on the client device, remote procedure calls (RPC) and other inter-process communications, structured query language (SQL) queries, electronic data interchange (EDI) communications, and requests using a general or specialized protocol suitable for obtaining about the client device. The information usable by the system includes information that can be used directly to assess the display capabilities of the device (e.g., resolution, dots per inch, pixels per inch, orientation, or aspect ratio). The system may also obtain information that indirectly allows the display capabilities of the device to be determined. For example, the system may receive a model number associated with the device that may be used to locate the corresponding display capabilities, which may be stored in a database, table, list, or other reference source. Such information may include extended information that is not normally utilized by the device, such as the physical size of the display.

Based on the display capabilities, for example, the aspect ratio of the device, the adaptive layout and workflow engine selects a default layout for presenting the attachment to the user. The selection of the default layout may be based on the display characteristics of the device, the type and/or format of the content, the amount of the content, or the applications used to present the content. Devices with constrained displays, such as having small aspect ratios and/or small physical sizes, may not be well suited for simultaneously displaying the attachment and the container. In such cases, the default layout automatically selected by the adaptive layout and workflow engine may be a full screen layout presenting only the attachment. Other layouts may be available to be manually selected by the user, such as, but not limited to, a side-by-side layout and other multiple region layouts. On the other hand, for devices with more generous display capabilities, such as large aspect ratios, multiple displays, and/or large physical displays, the default layout automatically selected by the adaptive layout and workflow engine may be a side-by-side layout and other multiple region layouts may be considered suitable for simultaneously displaying the attachment and the container. The various layouts may be predefined and stored as layout definitions 120.

Layout selection may be based solely on the display characteristics. Basic layout selection may involve an evaluation of the display size and, when appropriate, the aspect ratio or orientation. Some determinations may be based soled on display size. For example, some displays having small resolutions or physical sizes (e.g., a smartwatch or smart phone) may never be suitable for a side-by-side view, regardless of orientation. However, in some instances, a side-by-side view may be appropriate depending upon the orientation of display (e.g., when in a landscape orientation).

Similarly, layout selection may involve evaluating selected usable or acceptable widths for displaying the container and the attachment in a meaningful side-by-side view against the available display area. Different selected widths may be established for the container and the attachment. When the sum of the selected widths of the container and the attachment are greater than the available display width, the adaptive layout and workflow engine selects a full screen view as the default layout for displaying the attachment. The selected widths may represent minimum widths for a proportional view layout or an absolute width for at least one of the attachment and/or the container in a fixed view layout. For example, a side-by-side view may be defined by allotting a fixed 400 pixels or a proportional 40% of the display width to the attachment and the remainder to the container, provided that the display has a minimum width of 1000 pixels or the attachment or container has a selected minimum width (i.e., the container width is at least 600 pixels, in this example).

More complex layout selection may consider the context or the characteristics of the content in addition to the display characteristics. Layout selection may also factor in the format of the content, the type of content, the amount of content, and the applications used to present the content. For example, if the content is of a type that is not editable (i.e., read-only), a smaller minimum width may be acceptable than if the content is editable because of factors such as the limited need to manipulate the content for viewing (e.g., primarily scrolling) in contrast to the additional display requirements of the editing user interface (e.g., a virtual keyboard) and the increased precision typically required for editing.

The type and format of the content may also be factored into layout selection. If the content is in a reflowable format rather than a fixed format, a side-to-side view may be acceptable because the content may be reformatted to fit within the available area without requiring horizontal scrolling, significantly reducing the scale or font size of the content to fit within the space allotted, or otherwise reducing the readability of the content. In many cases, horizontal scrolling is less acceptable than vertical scrolling because of the way that users are accustomed to processing content. In contrast, displaying fixed format content that exceeds the available width allotted in a side-to-side view necessarily requires reducing the scale of the content or horizontal scrolling. In the case of fixed format documents, the amount of scale reduction needed to avoid horizontal scrolling may render the content virtually unreadable on small form factor, low resolution, and small aspect ratio devices. While reflowable content is often associated with text, reflowable content may also include images, tables, and other elements that have fixed size or otherwise do not reflow well. Accordingly, the adaptive layout and workflow engine may apply a threshold to the proportion of such fixed size elements to the reflowable elements when determining the default layout.

Layout selection may also consider the amount of content in the attachment. If the amount of content is small, a side-to-side view may be acceptable, even where the presentation is compressed width-wise (e.g., only a few word per line), when the entire content is displayable at one time or with limited scrolling (e.g., vertical scrolling). Conversely, a long document, even if it can be presented in the allotted space of a side-to-side view, may be better suited to full screen view to minimize the amount of vertical scrolling required.

Additionally, the application user interfaces involved may be factored into layout selection. A full screen layout may be selected when the application user interfaces involved require significant amounts of display space, especially to the sides of the content.

The adaptive layout and workflow engine may incorporate some or all of the various aspects of layout selection in any combination. For example, consideration of the application user interfaces may be combined with the determination of whether the content is editable or not. Thus, whether the default layout for editable content is a side-by-side view or a full screen view may depend on the application user interface.

In addition to automatically adapting the default layout for presenting compound content to the user based on the device used to consume the content, the adaptive layout and workflow engine may also provide adaptive workflows via the user interface based on the display capabilities of the device used to consume the content, and, optionally, the nature of the content and/or the actions taken by the user. The adaptive workflows provide context-sensitive task controls that allow the user to perform sequences of actions incorporating information from the compound content in ways that minimize limitations resulting from constrained displays. The context-sensitive task controls initiate task sequences that allow the user to focus on substantively working with the content rather than logistically managing the individual content items and switching between various applications to initiate multiple actions (e.g., load, save, edit, create, reply, or send) involved in completing the substantive task, which may be especially inefficient or unnecessarily complicated or difficult on devices with constrained displays. The adaptive context-based workflows may be predefined and stored as workflow definitions 122.

The nature of the content and/or the actions taken by the user considered may be used by the adaptive layout and workflow engine to predict the tasks the user may or is likely to perform. For example, if the content is not editable (e.g., a fixed format document), the adaptive workflow will not provide context-sensitive task controls involving editing the document, but may provide context-sensitive task controls associated with responding to the email or redistributing the attachment in a new email (as opposed to forwarding the original email). If the user opens an editable email attachment for viewing, the adaptive layout and workflow engine may predict that the user is likely to engage in further communications based on or including the attachment without editing the attachment and may provide context-sensitive task controls for replying to the email or redistributing the attachment in a new email via the user interface of viewing application.

Although described herein in the context of distributed system as a specific example benefiting from the device-aware adaptive layout and workflow functionality provided, the system may be suitably used in other contexts, including purely local contexts where the adaptive layout and workflow engine and the associated applications run on the client device.

FIGS. 2A-2D illustrate aspects of a user interface provided by the system allowing a user to selectively display an email and its attachments in various views rendered optimized for a device with a width constrained display. Width constrained displays are generally any display whose physical size, resolution, dots per inch (dpi), pixels per inch (ppi), and/or aspect ratio are not well for displaying multiple documents at one time. Width constrained displays may have smaller widths than heights (e.g., 3:2 or 71:40 aspect ratios) or may have only slightly larger widths than heights (e.g., a 4:3 aspect ratio). The specific aspect ratios mentioned herein are representative and not intended to be limiting in any way. Examples of devices having width constrained displays include, but are not limited to, smartphones and some tablets, as well as some laptops and monitors used with desktop computers.

Figure 2A:
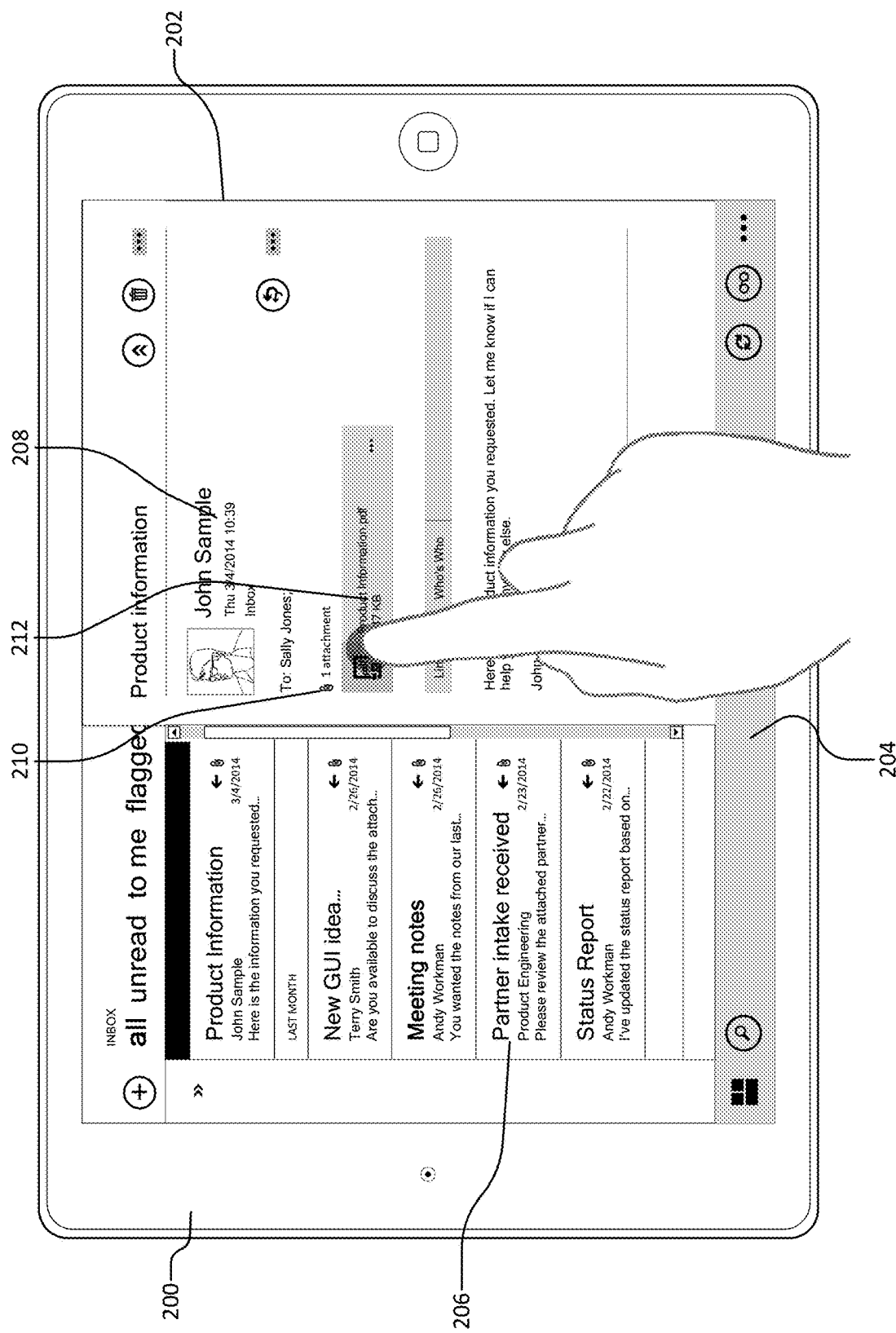
FIGS. 2A-2D illustrate aspects of a user interface provided by the system allowing a user to selectively display an email and its attachments in various views rendered optimized for a device with a width constrained display.

FIG. 2A illustrates aspects of a user interface for an email application presented by the adaptive aspect ratio system on the device with the width constrained display. In the illustrated embodiment, the device 200 with the width constrained display 202 is a tablet with a 4:3 aspect ratio. While larger than smartphones, the displays on tablets are still limited in size and resolution compared to desktop displays. Although described in the context of a tablet as a representative computing device, the adaptive aspect ratio system is operable with a wide variety of computing devices including, but not limited to, smartphones, tablets, laptops, and desktop computers using a wide variety of user interface and input types, such as, but not limited to, speech, typing, touch gestures, and menu navigation via, for example, text based interfaces, graphical user interfaces (GUIs), natural user interfaces (NUIs), spoken language interfaces (i.e., speech recognition systems).

The user interface 204 of an email application provided via the user agent shows a two panel view of the inbox 206 and a selected email message 208 containing an attachment 210. The user wishing to view the attachment clicks on the attachment control 212 in the email message user interface. At this time, the adaptive layout and workflow engine determines the size of the display area available for rendering the email attachment. In this case, the user interface is rendered on a tablet with a relatively limited display and 4:3 aspect ratio. The adaptive layout and workflow engine may also consider the size of the attachment and the user interface of the viewer. The attachment is a document with a size that is large relative to the size of the display on the tablet. Accordingly, the adaptive layout and workflow engine determines that the attachment should be rendered in a full screen view on the tablet display for consumption by the user.

Figure 2B:
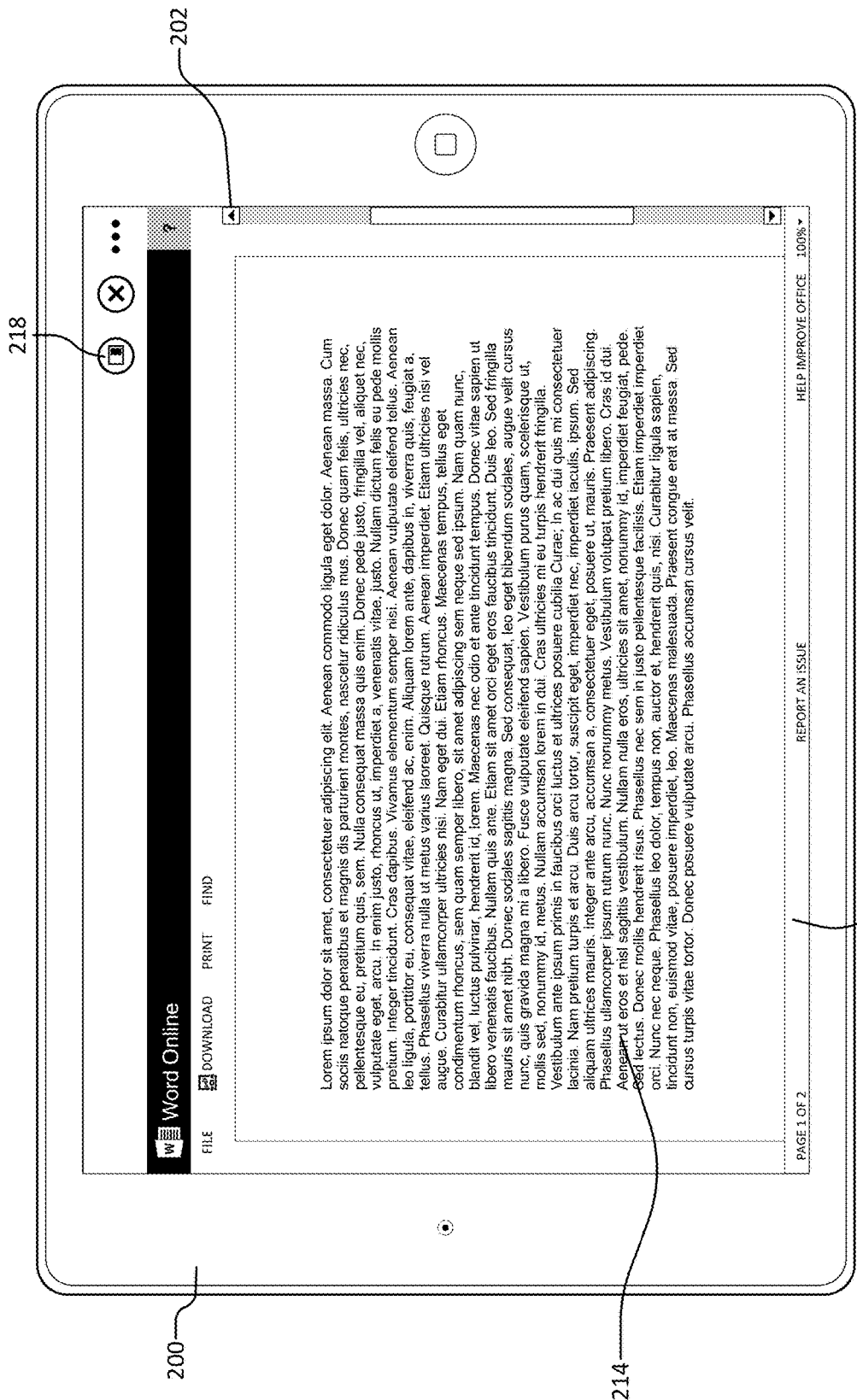

FIG. 2B shows aspects of the default full screen view based on the available display area of the width constrained tablet using the system. Although the adaptive aspect ratio system selected the full screen view of the attachment 214 as the most appropriate default view given the available display area, the user interface 216 of the viewer application may offer the user with an option to manually select one or more alternate views. For example, the adaptive layout and workflow engine may show an alternate view control 218 in the user interface of the document viewer/editor application. In the illustrated embodiment, the alternate view control is a side-by-side view control.

Figure 2C:
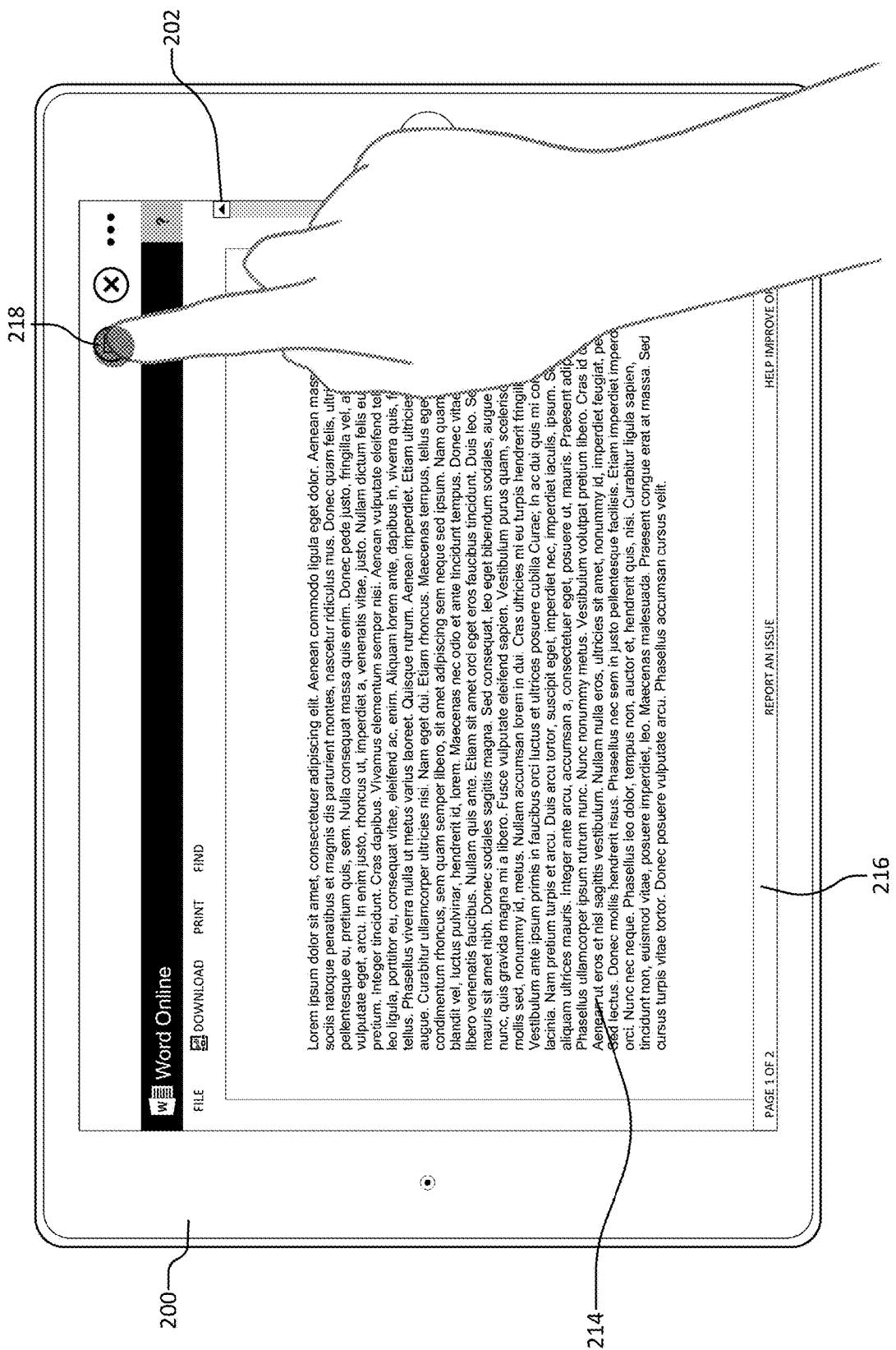

FIG. 2C shows aspects of interaction with the user interface of the document viewer/editor application to select an alternate view using the system. For example, the user may wish to review the email that contained the attachment while also viewing the attachment and clicks on the side-by-side view control 218 in the user interface of the document viewer/editor application causing the adaptive aspect ratio display system to present a scaled side-by-side view of the attachment and the email in the user interface.

Figure 2D:
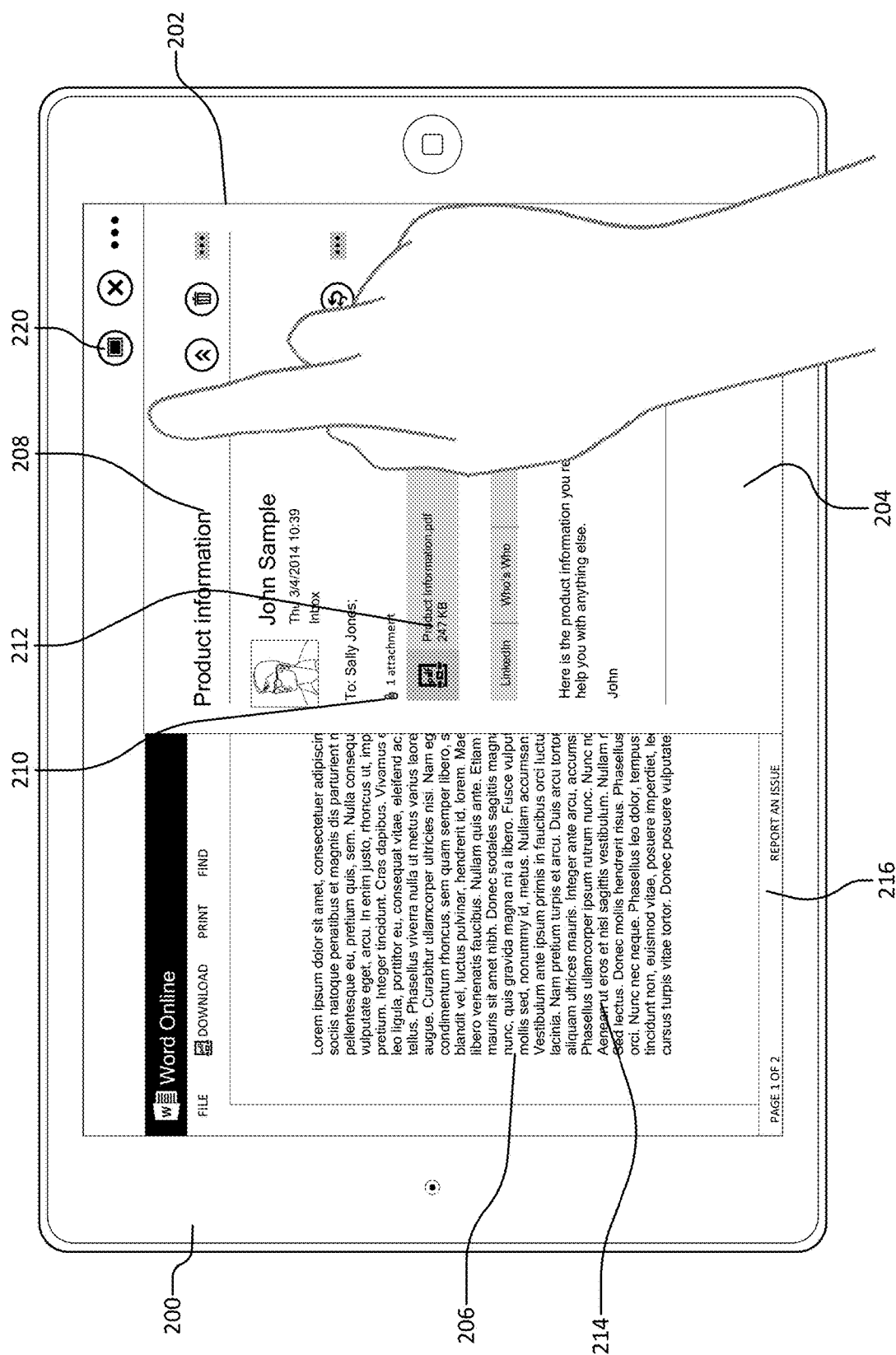

FIG. 2D illustrates aspects of the user interface presented by the adaptive layout and workflow engine showing a scaled side-by-side view of the email attachment and the email on the device with the constrained width display. In the alternate view, the user interface may present a default view control 220 allowing the user to manually return to the default layout and view the attachment individually in a full screen view.

Figure 3A:
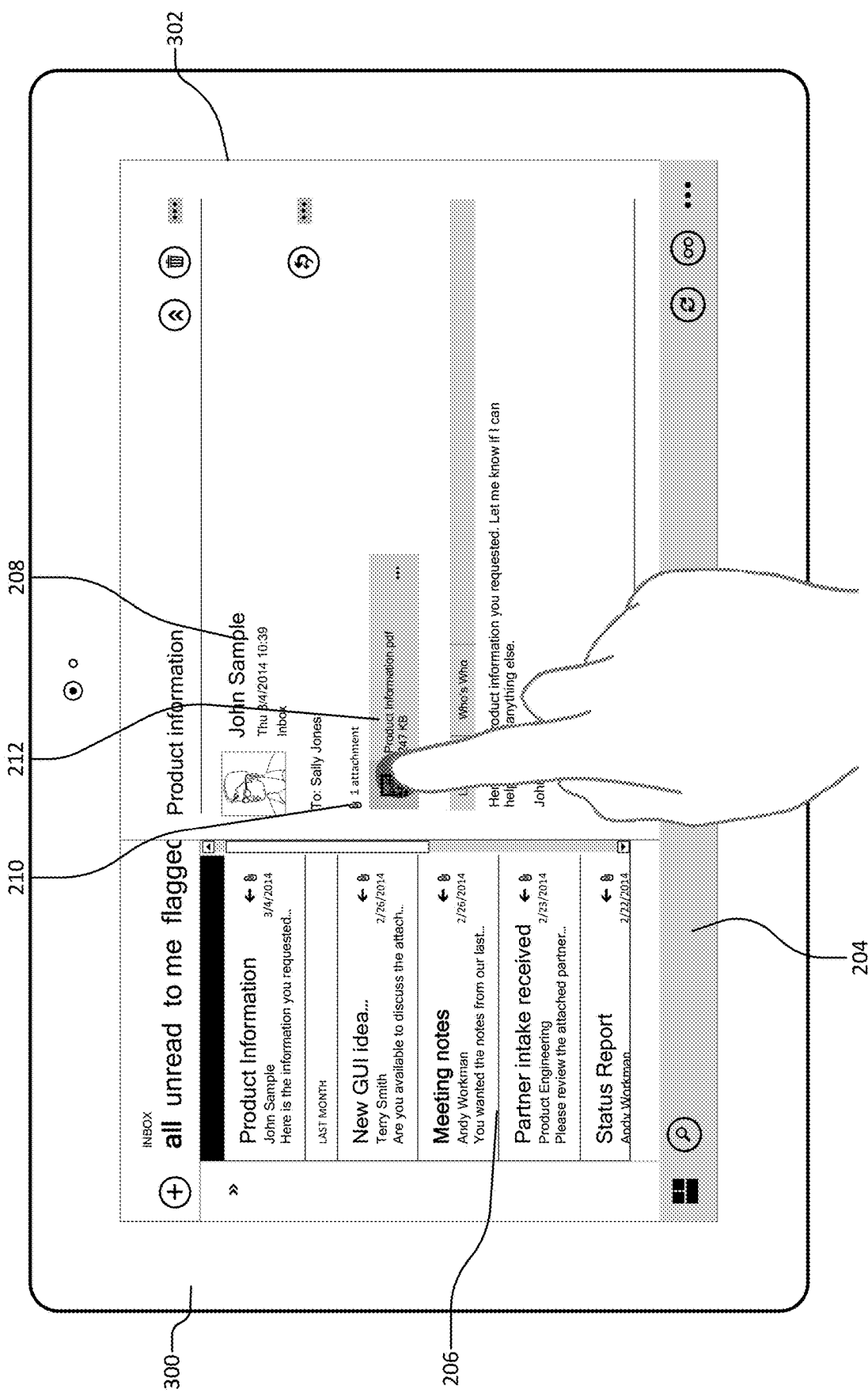
FIGS. 3A and 3B illustrate aspects of a user interface provided by the system allowing a user to selectively display an email and its attachments in various views rendered optimized for a device with a large aspect ratio display.
Figure 3B:
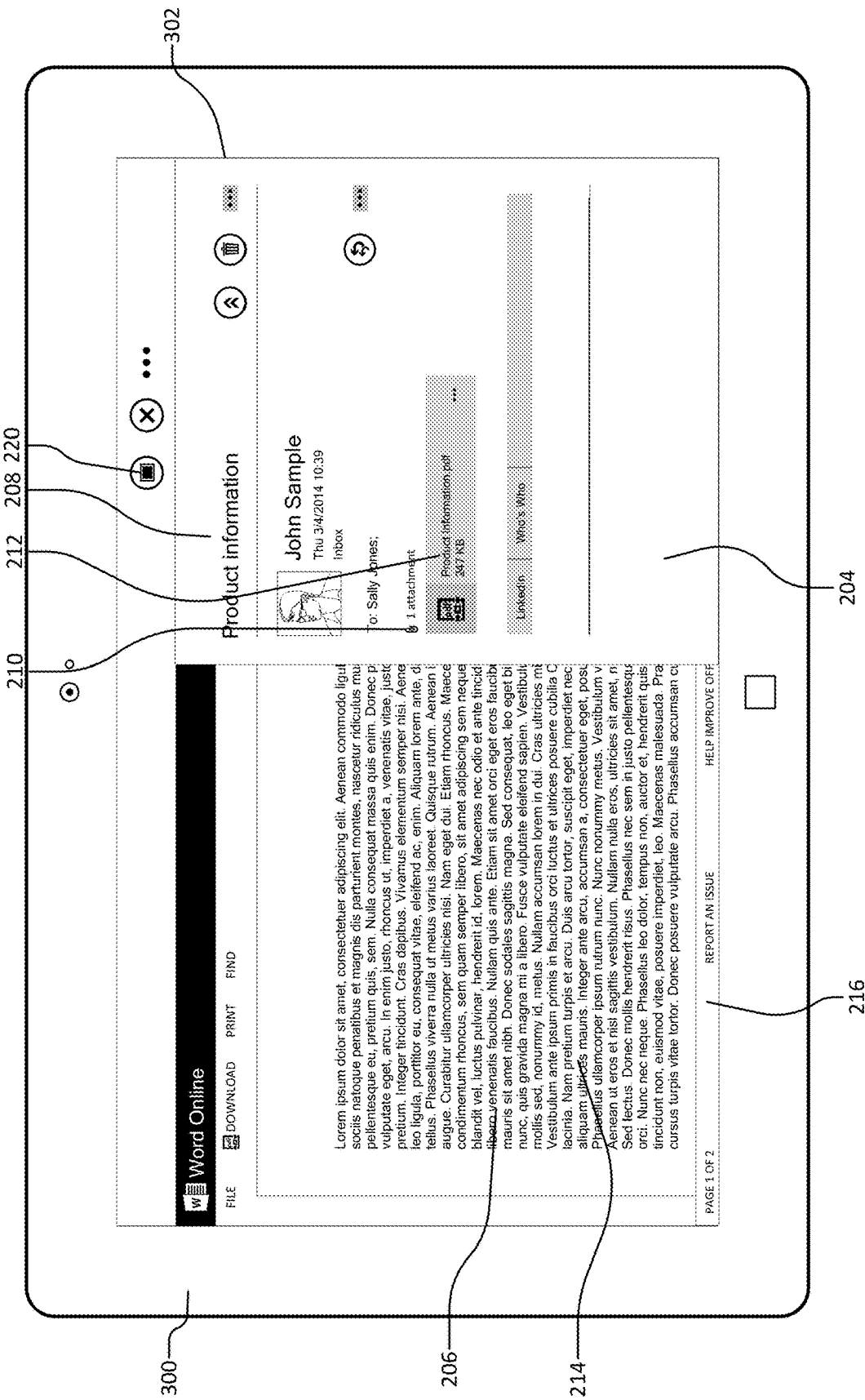

FIGS. 3A and 3B illustrate embodiments of a user interface provided by the system allowing a user to selectively display an email and its attachments in various views rendered optimized for a device with a large aspect ratio (e.g., 16:9 or 16:10 aspect ratios) display. Examples of devices with large aspect ratio displays include, but are not limited to, some tablets, laptops, and monitors used with desktop computers.

FIG. 3A illustrates aspects of a user interface for an email application presented by the adaptive aspect ratio system on a device with a large aspect ratio display. In the illustrated embodiment, the device 300 with the large aspect ratio display 302 is a tablet with a 16:9 aspect ratio. As before, the user clicks the attachment control in the email message and the system selects the default display.

FIG. 3B shows a default side-by-side view of the attachment and the email message on the tablet with the large aspect ratio display using the system. In this instance, the default layout selected by the system is a side-by-side view because the larger width of the tablet is suitable to display a substantial portion of both documents with limited overlap. The system may scale the side-by-side view to display the wider view of one content item and a narrower view of the other content item. For example, when the attachment is a fixed format document, the system may devote more of the available display area to showing the attachment and using a minimal amount of space to display the email message, which is generally a flowing document that reformats based on the available view window. The user interface on a device with a large aspect ratio display may still offer alternative view controls giving the user the ability to change to a full screen view of either content item or another available layout.

FIGS. 4A-4F illustrate embodiments of a user interface implementing a customized workflow implemented by the system to provide the user with an immersive interactive experience that lets the user focus on performing substantive work instead trying to navigate through the ministerial functions associated with the task on the device with the width constrained display.

Figure 4A:
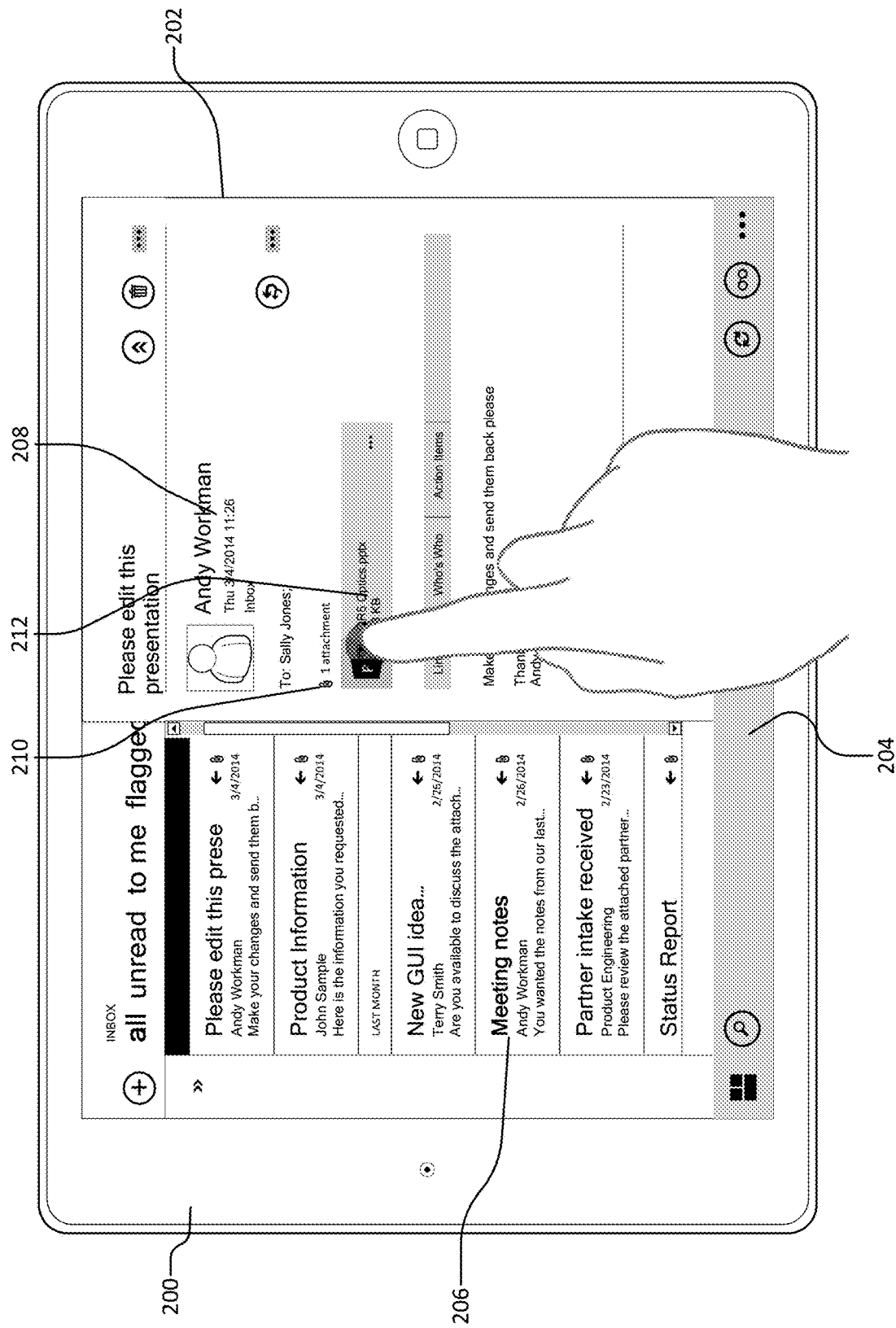

FIG. 4A shows the user initiating interaction with the attachment; however, the attachment is an editable document (e.g., a presentation). Once again, the system determines that the device requesting the document has a width constrained display and selects the default full screen view for the attachment.

Figure 4C:
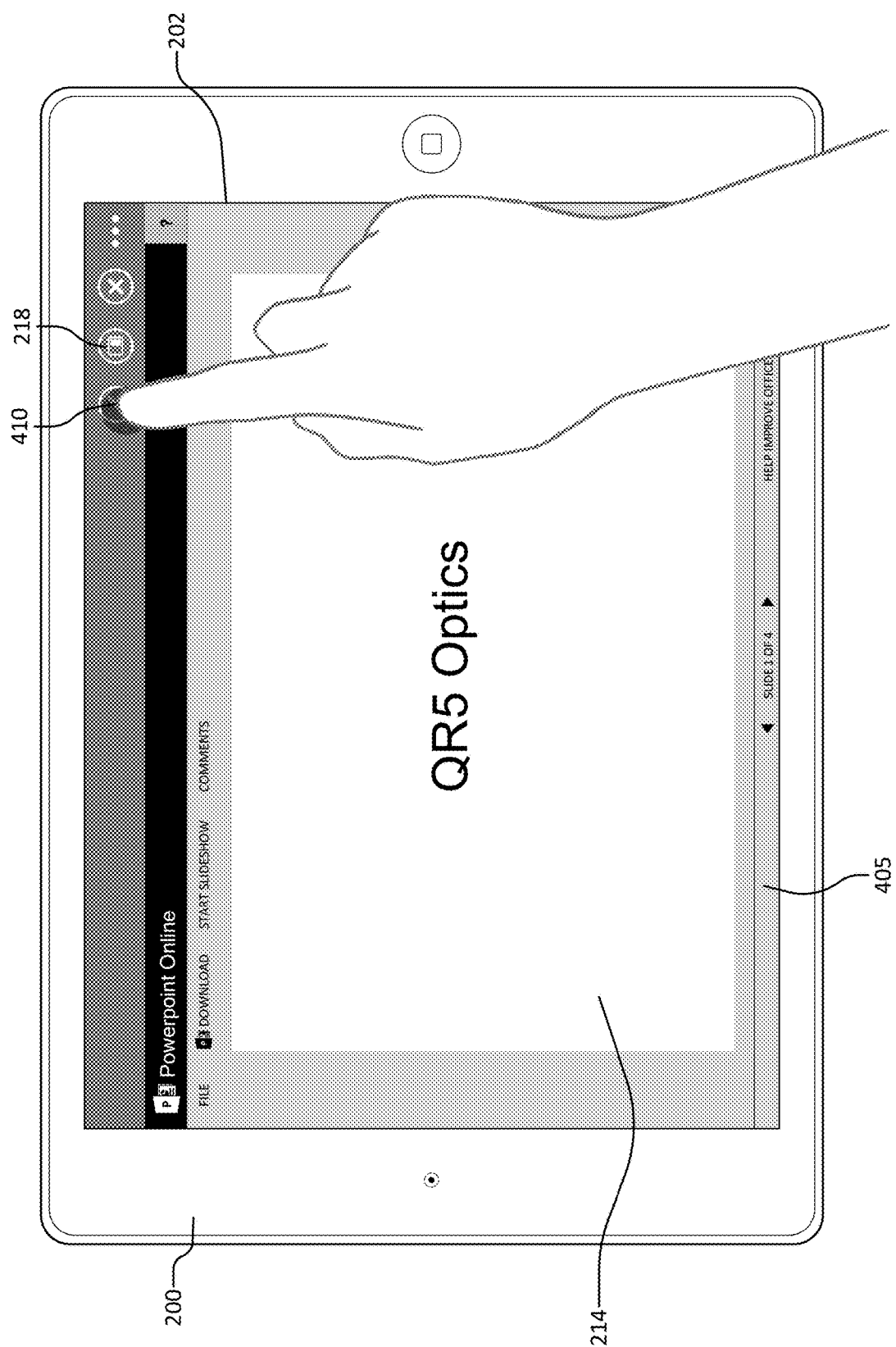

FIG. 4B shows the editable presentation initially opened in a full screen view layout on the device having a width constrained display in viewing mode. The system initially predicts that the user is interested in viewing the document and displays the presentation in a view-only user interface 405 of the presentation application mode (e.g., slideshow presentation mode). However, the system presents edit control 410, a context-sensitive workflow control, providing access to the presentation edit mode of the presentation application. FIG. 4C shows the user manually initiating editing of the presentation by activating the edit control.

Figure 4D:
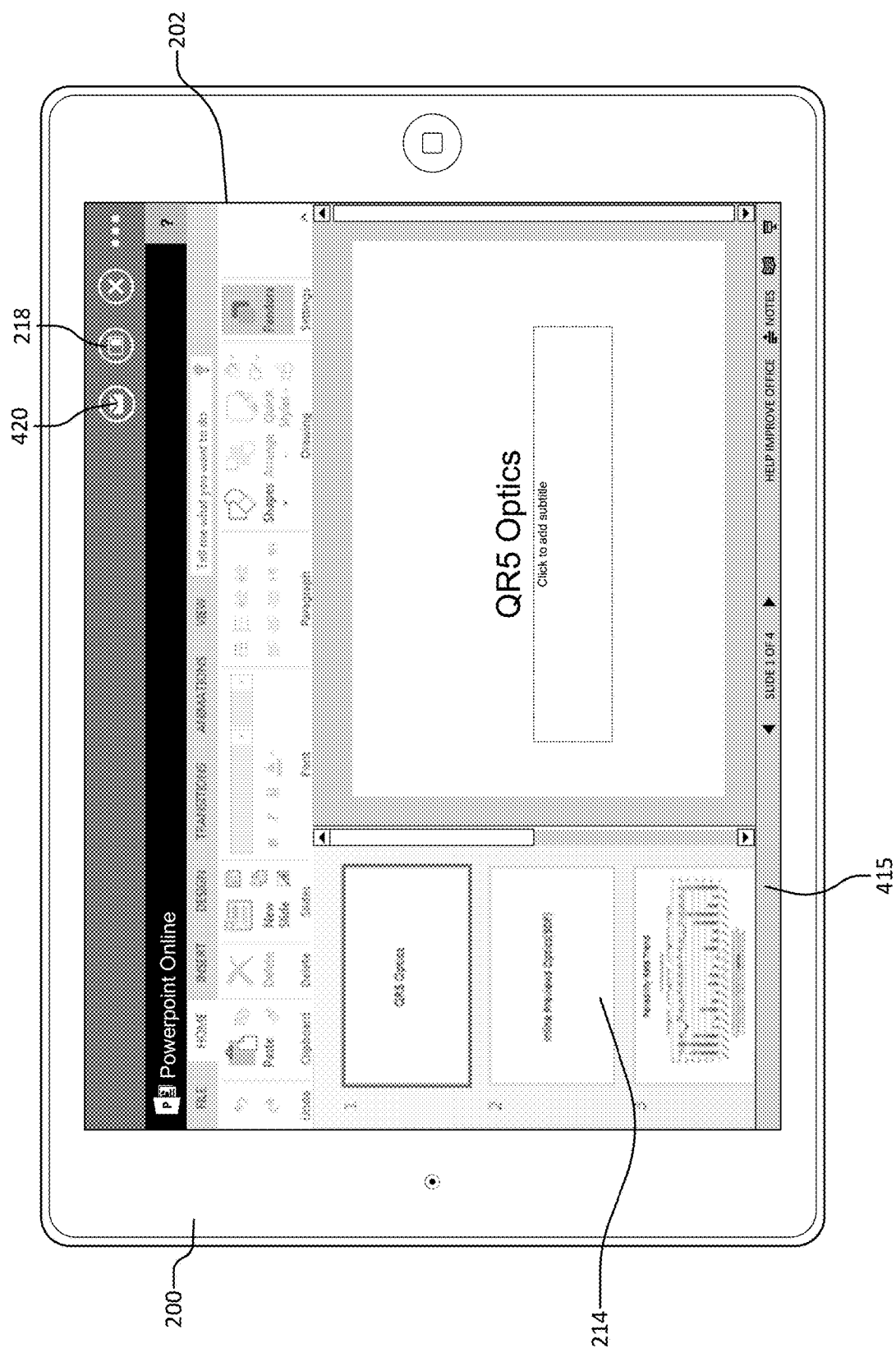
Figure 4E:
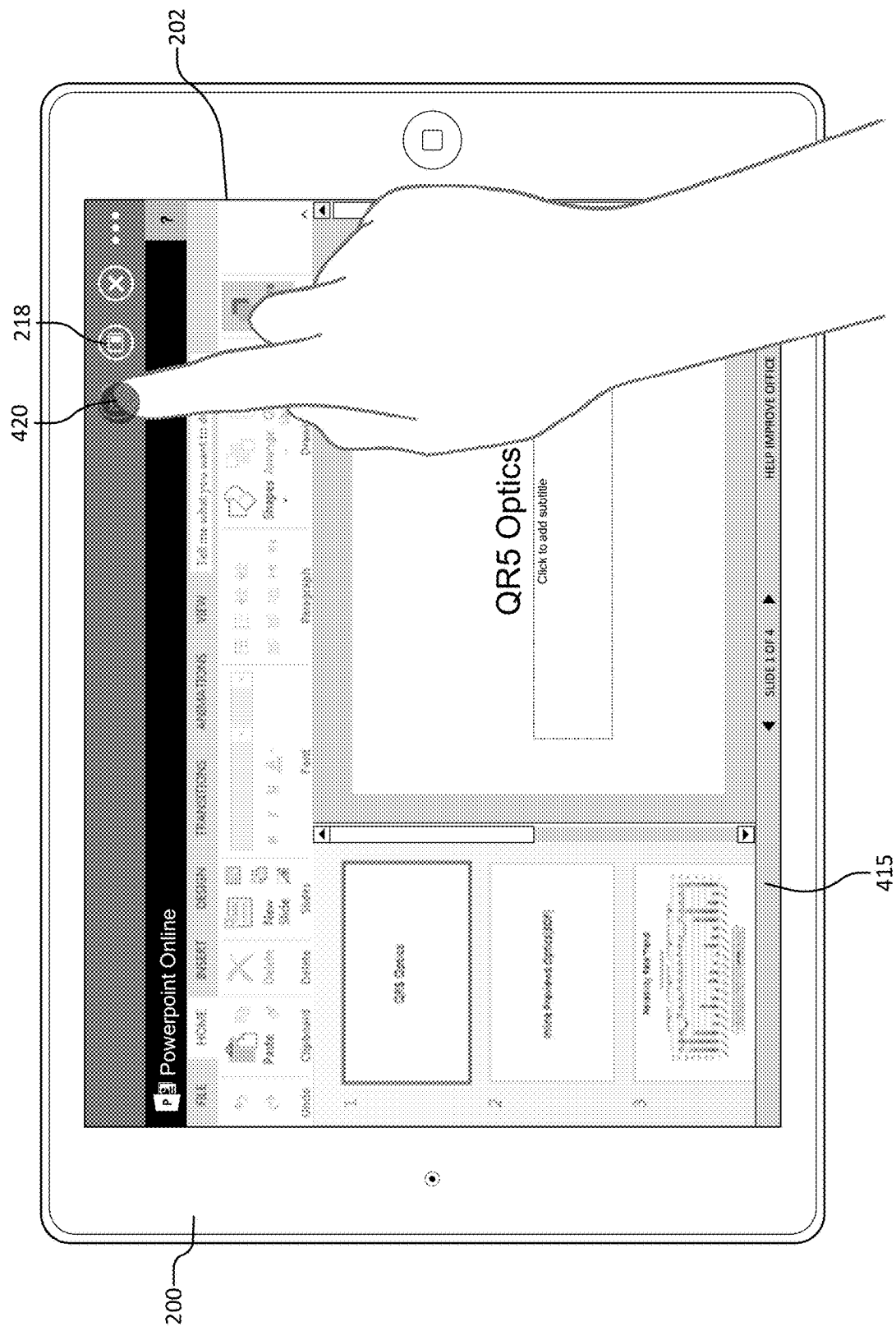

FIG. 4D shows the editable presentation opened in a full screen view layout on the device having a width constrained display in editing mode. The user may edit the presentation via the presentation editing user interface 415 of the presentation application mode. Based on the task context, the system predicts that the user may want to send the edited attachment to someone else once changes have been made. Accordingly, the system provides save-and-share control 420 to facilitate the task of sending the revised attachment via email. FIG. 4E shows the user manually selecting to save-and-share control after changes have been made to the presentation.

Figure 4F:
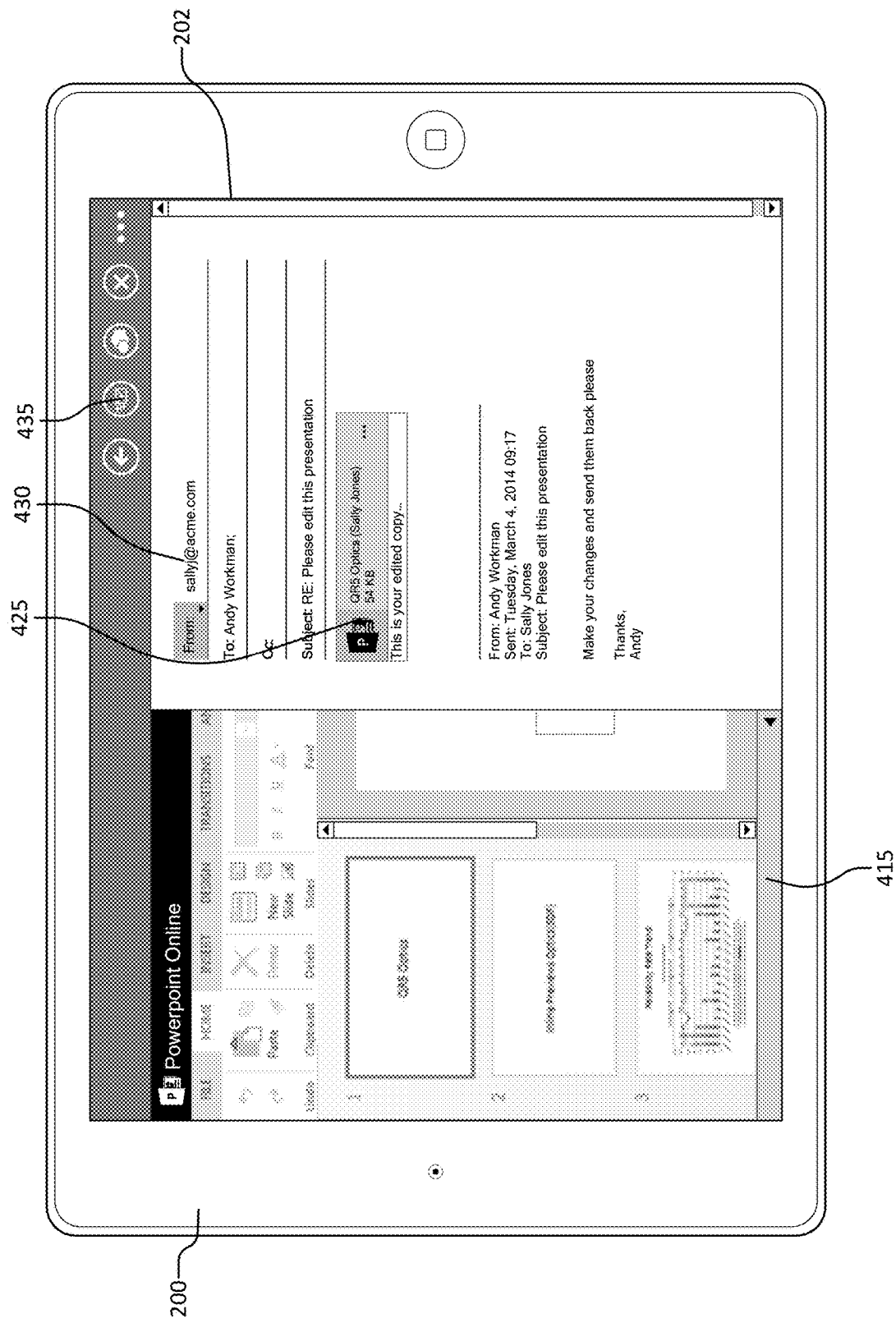

FIG. 4F shows aspects of the conclusion of the dynamically customized workflow for revising and sending an email attachment using the system. The save-and-share control generates a draft email message, attaches the copy 425 of the revised presentation, and displays the resulting draft email message 430 in a device appropriate layout where it may be edited by the user for sending. Finally, a context-sensitive send control 435 may be provided by the adaptive layout and workflow engine as part of the presentation editing user interface 415 or the user interface 216 of the email application to actually send the finalized email message.

These predicted actions are accomplished from the presentation editing user interface 415 and do not require the user to switch between the presentation application, the email application, and various file system dialogs to compile the information into an email message ready to finalize and send. The adaptive workflow implemented by the system provides the user with an immersive interactive experience that lets the user focus on performing substantive work instead trying to navigate through the ministerial functions associated with the task (e.g., locating the saved copy of the revised presentation to attach to the draft email).

Even though the actions are performed on the device with a constrained display, the system may display the draft email message in a side-by-side layout with the presentation rather than alone in a full screen view, as in the illustrated embodiment. This may occur because the adaptive layout and workflow engine recognizes the context of the situation is that the user has finished substantively working with the presentation, but may desire to review/incorporate information from the revised presentation into the body of the email message. Further, given that the email message is generally a flowable document, it may be effectively composed/edited in a relatively small amount of display area. Similarly, review and/or consumption of the finished revised presentation may be accomplished using less display area than is typically required during composing and/or editing. However, a different layout may be selected on a different device. For example, on a smartphone, the draft email message may be presented in a full screen layout.

Figure 5A:
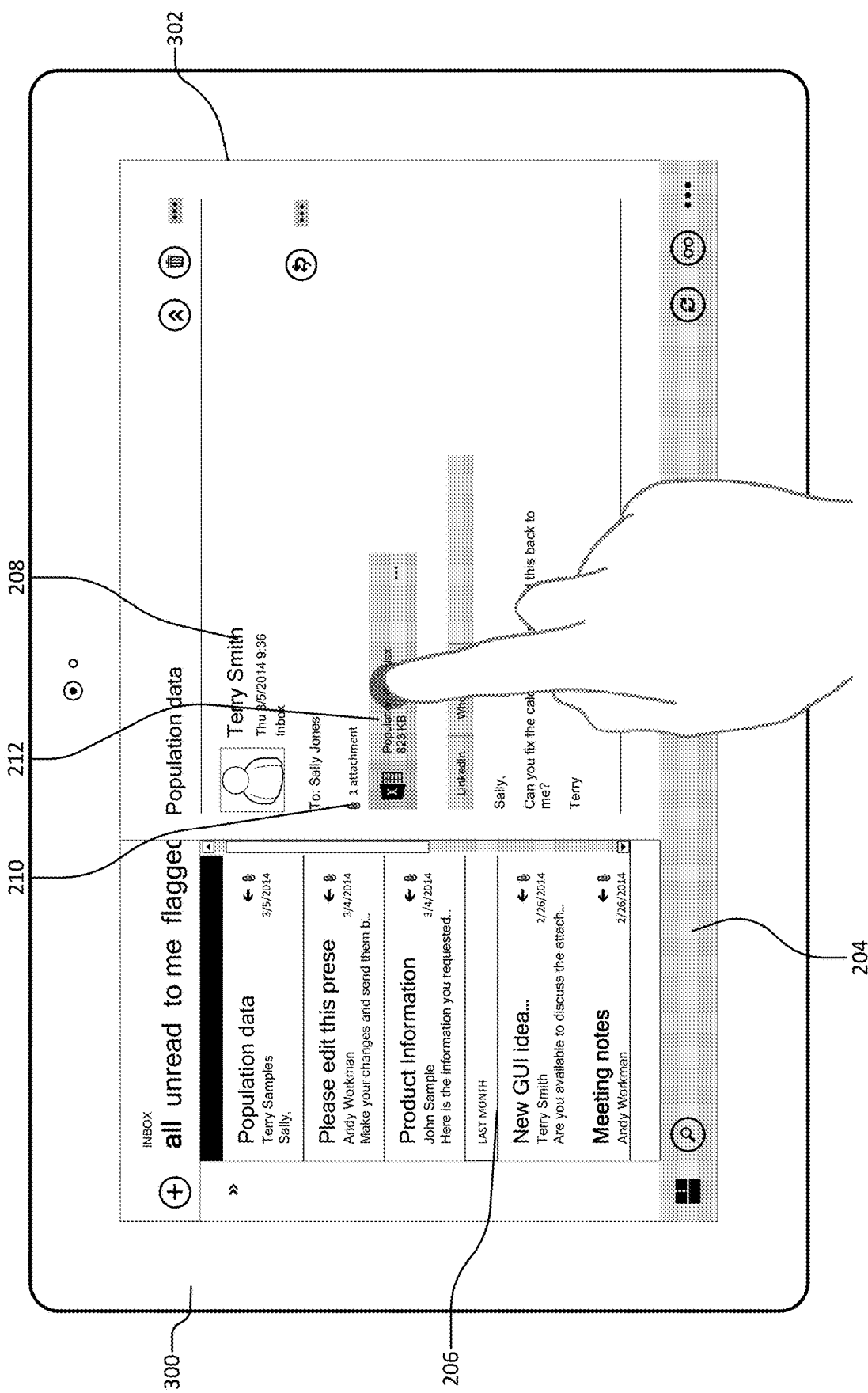
FIGS. 5A-5C illustrate aspects of a user interface implementing a customized workflow implemented by the system to provide the user with an immersive interactive experience that lets the user focus on performing substantive work instead trying to navigate through the ministerial functions associated with the task on the device with the large aspect ratio display.
Figure 5B:
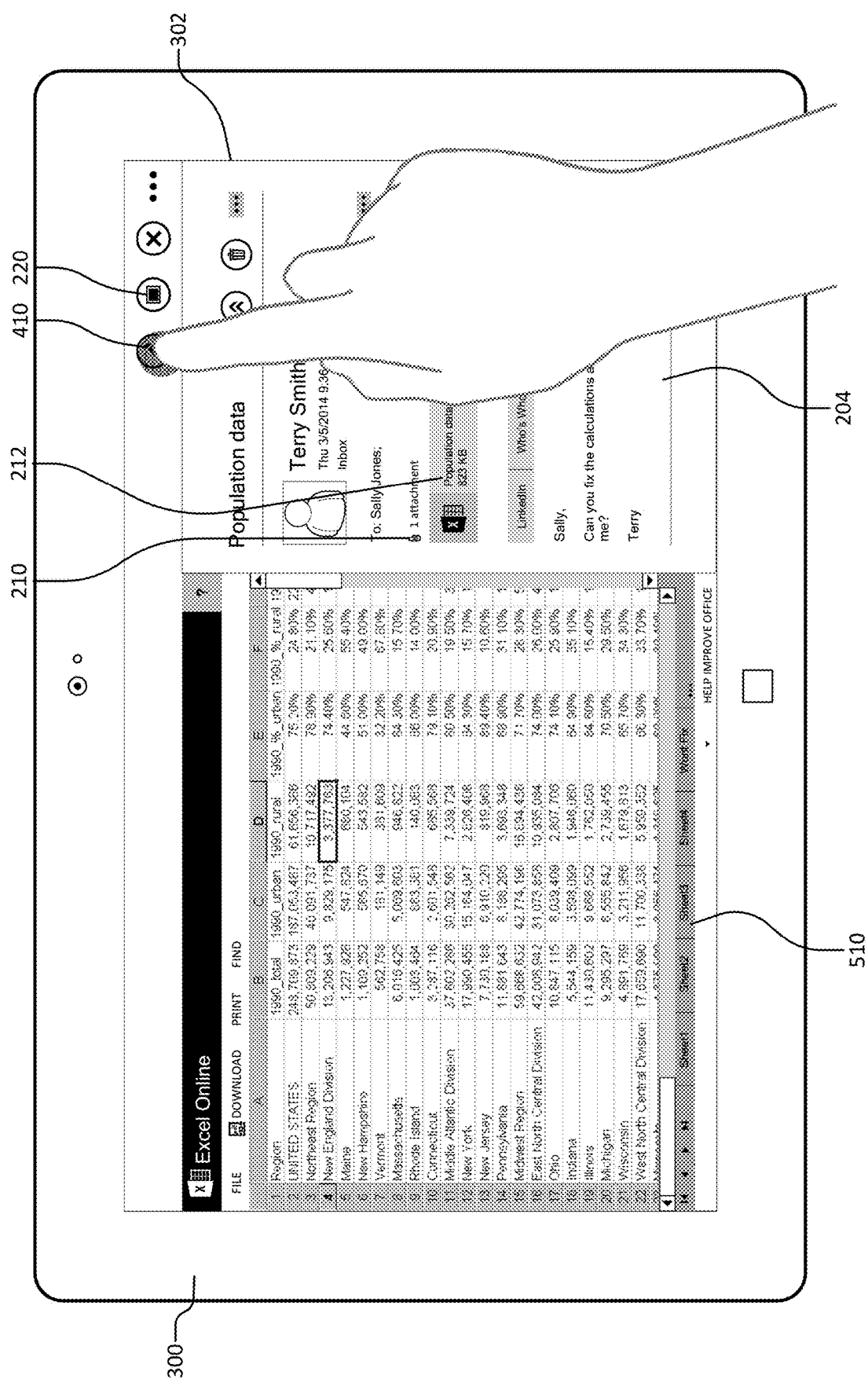
Figure 5C:
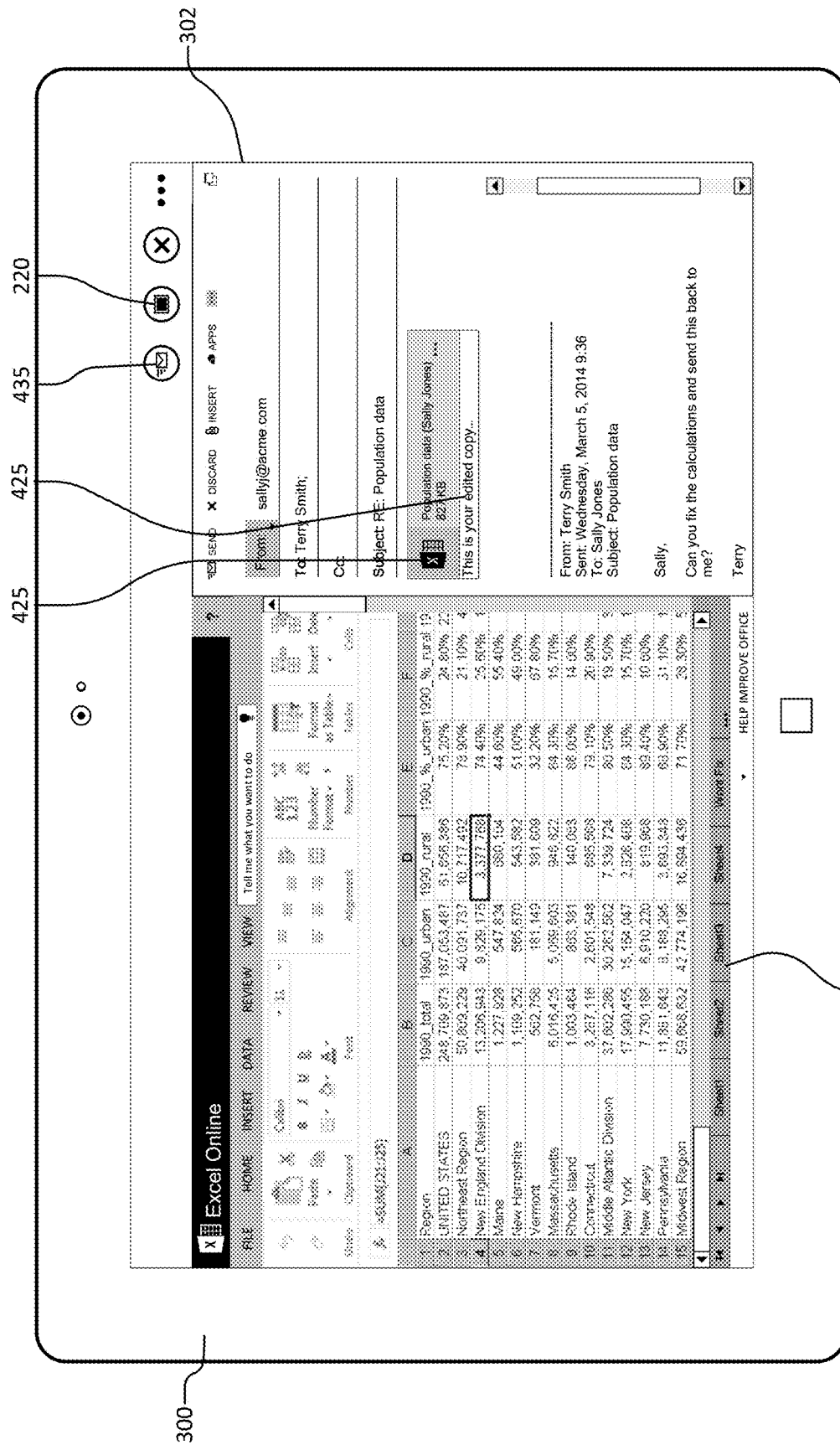

FIGS. 5A-5C illustrate aspects of a user interface implementing a customized workflow implemented by the system to provide the user with an immersive interactive experience that lets the user focus on performing substantive work instead trying to navigate through the ministerial functions associated with the task on the device with the large aspect ratio display using the system. FIG. 5A shows the user initiating interaction with the editable attachment 212, a spreadsheet. FIG. 5B shows the default layout of a side-by-side view of the attachment and the email message based on a determination by the adaptive layout and workflow engine that the tablet has enough display area available to present both content items in a reasonably effective manner using the view mode user interface 510 of the spreadsheet application. Again, the user decides to edit the spreadsheet using the context-sensitive edit control 410.

The illustrated embodiment also shows that the side-by-side layout has been scaled in a manner predicted by the adaptive layout and workflow engine to optimize the use of the available display area. In contrast to the view mode embodiment of FIG. 2D, the email message occupies less of the overall display area and may occupy less actual display area as a result of optional scaling (e.g., layout scaling) by the adaptive layout and workflow engine. In FIG. 2D, the portion of the layout allocated to the incoming email message occupies more than half of the available display area on the constrained display tablet. In FIG. 5B, the portion of the layout allocated to the incoming email message has been scaled down to devote a greater portion of the layout for showing the spreadsheet content. The determination of the scaling applied by the adaptive layout and workflow engine may be based on the display capabilities of the device, as well as additional factors, such as, but not limited to, content type and characteristics. For example, flowing content (e.g., an email message) may be scaled down to show more of a fixed (e.g., an image) or large (e.g., a spreadsheet) format document that normally benefits from being displayed in a larger display area.

FIG. 5C shows aspects of the conclusion of the dynamically customized workflow for revising and sending an email attachment. Because the larger aspect ratio makes it practicable to display and edit the attachment while simultaneously displaying and composing a draft email for transmitting the revised attached, the adaptive layout and workflow may dynamically shorten the workflow using the system. In this instance, the adaptive layout and workflow engine dynamically updates the edit control 410 to provide edit-and-share functionality. Activating the edit control 410 results in switching to the edit mode user interface 515 of the spreadsheet application, generating a draft email message, attaching the copy 425 of the revised spreading, and displaying the resulting draft email message 430.

In this instance, the default layout selected by the system for the tablet with the large aspect ratio display is a side-by-side view because the larger width of the tablet is suitable to display a substantial portion of both documents with limited overlap. The system scales the side-by-side view to display the wider view of one content item and a narrower view of the other content item. For example, when the attachment is a fixed format document, the system may devote more of the available display area to showing the attachment and using a minimal amount of space to display the email message, which is generally a flowing document that reformats based on the available view window. The user interface on a device with a large aspect ratio display may still offer alternative view controls giving the user the ability to change to a full screen view of either content item or another available layout.

Figure 6:
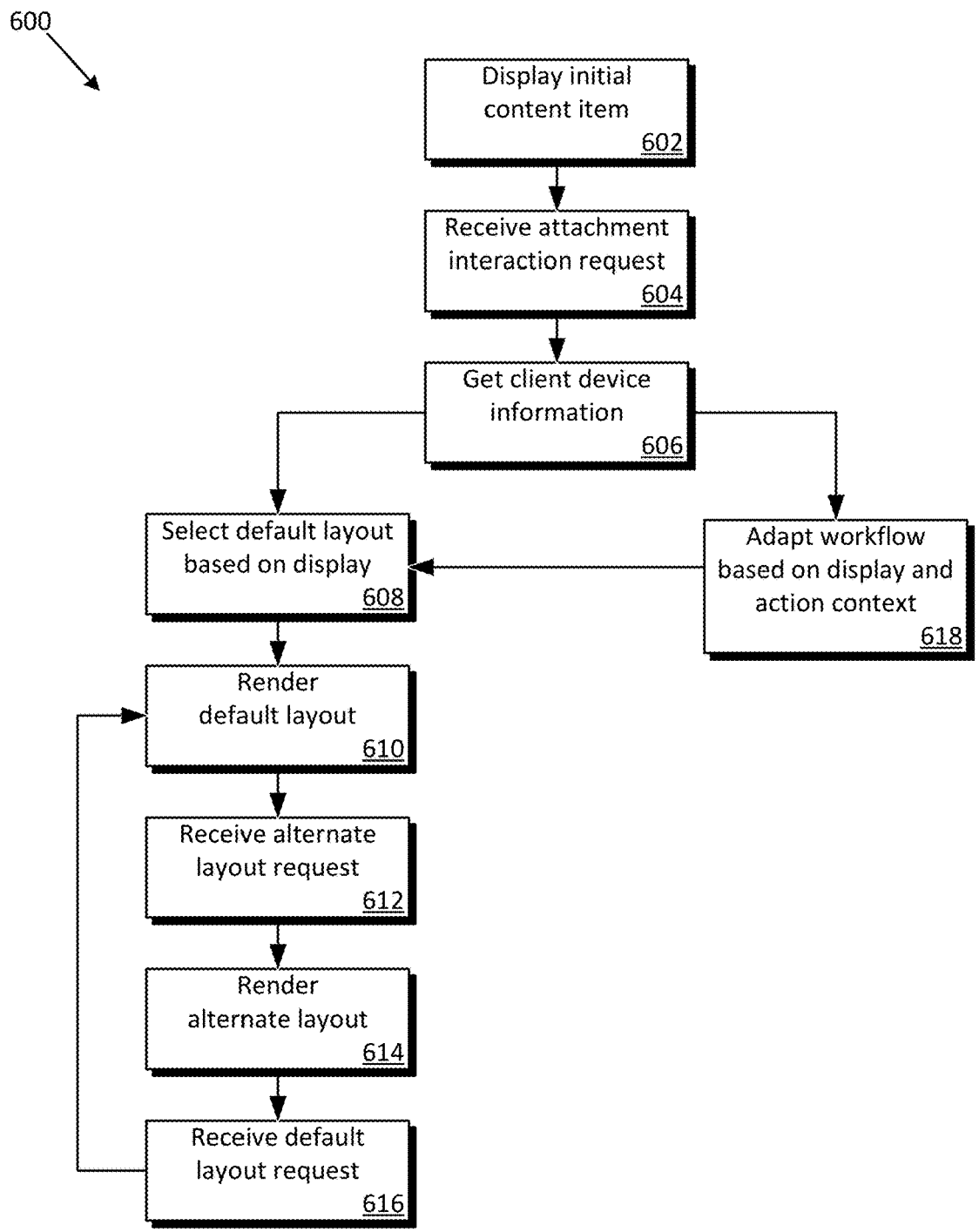
FIG. 6 is a high level flowchart showing aspects of the method for providing immersive document interaction with device-aware scaling.

FIG. 6 is a high-level flowchart showing aspects of the method for providing immersive document interaction with device-aware scaling. The method 600 begins with an initial content display operation 602 in which the system renders the initial content item having an associated an attachment on the client device via the user interface. Next, in a content interaction operation 604, the system receives a request indicating that the user wishes to interact with the attachment.

An information collection operation 606 collects information about the device used to make the request. The information collected may include, but is not limited to, the type of device, the physical size of the display, the resolution of the display, and the aspect ratio of the display. The information collected may also include information about the amount of the display available to the application for use in rendering the content. For example, a portion of the display may be reserved for display of components of the operating system or other programs.

A layout selection operation 608 uses the information collected to automatically determine the appropriate default layout for displaying the attachment on the device. On devices with displays that are physically small, have low resolution, or have a constrained width (i.e., a small aspect ratio), the default layout may be a view presenting the attachment by itself (i.e., full screen). On devices with displays that are physically large, have high resolution, or have wider width (i.e., a large aspect ratio), the default layout may be a view presenting the attachment side-by-side with the initial content item (i.e., split screen). The amount of the display allotted to the initial content item and to the attachment may be scaled for the device.

A default view rendering operation 610 renders the attachment using the selected default layout. If the default layout presents the attachment by itself (i.e., full screen), an alternate view control may be presented in the user interface. The alternate view control allows the user to manually request an alternate layout, such as a side-by-side layout, displaying both the initial content item and the attachment.

In an alternate view request receipt operation 612, the system receives a request indicating that the user wishes to interact with the attachment using the alternate layout. An alternate view rendering operation 614 renders the attachment using the alternate layout (e.g., the side-by-side layout). Once again, the amount of the display allotted to the initial content item and to the attachment may be scaled for the device. In the alternate view layout, a default view control may be presented in the user interface and associated with a default view request operation 616. The default view control allows the user to manually return to the default layout and view the attachment individually in a full screen view. Other view controls, such as an initial view control, may be provided allowing the user to manually return to the initial layout displaying the initial content item individually in a full screen view.

The method may optionally include workflow customization. A workflow adaption operation 618 may dynamically select a sequence of actions (i.e., a workflow) based on the device display capabilities and the current context of the user interactions with the content items. For example, if the user initiates editing of an attachment directly from the email rather than storing the attachment locally and editing the local copy, it may be predicted that the user intends to resend or otherwise distribute the edited attachment.

The workflow adaption operation may also consider the device-appropriate layout associated with the one or more of actions from the sequence based on the device display capabilities. On a device having sufficient display area to allow the user to simultaneously work with both content items, a workflow may be broken down into fewer or different steps when compared to the workflow achieving the same end result on a device with limited display area.

For example, on a device with a large aspect ratio display, the workflow for editing an attachment and sending a reply including the revised attachment may allow the user to simultaneously edit the attachment and compose the reply in a side-by-side layout when the context-sensitive edit control is clicked. The revised attachment may be associated with (e.g., pre-attached by reference) to the draft email and the context-sensitive send control may serve to save the attachment and send the email to the designated recipient(s).

In comparison, on a device with a small aspect ratio display, the workflow takes into consideration that the device is better suited for editing the attachment separately from composing the reply using a full screen layout. Initially, the context-sensitive edit control brings up the attachment in the full screen layout. The workflow adds a context-sensitive share control that saves the revised attachment and attaches it to a draft email displayed using a device appropriate email composition layout, which may be full screen or a side-by-side layout. The context-sensitive send control provided in the email composition context may send the email to the designated recipient(s).

The subject matter of this application may be practiced in a variety of systems, devices, and other articles of manufacture or as methods and may be implemented as hardware, software, computer readable media, or a combination thereof. Aspects of the invention described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced may be accomplished by, without limitation, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
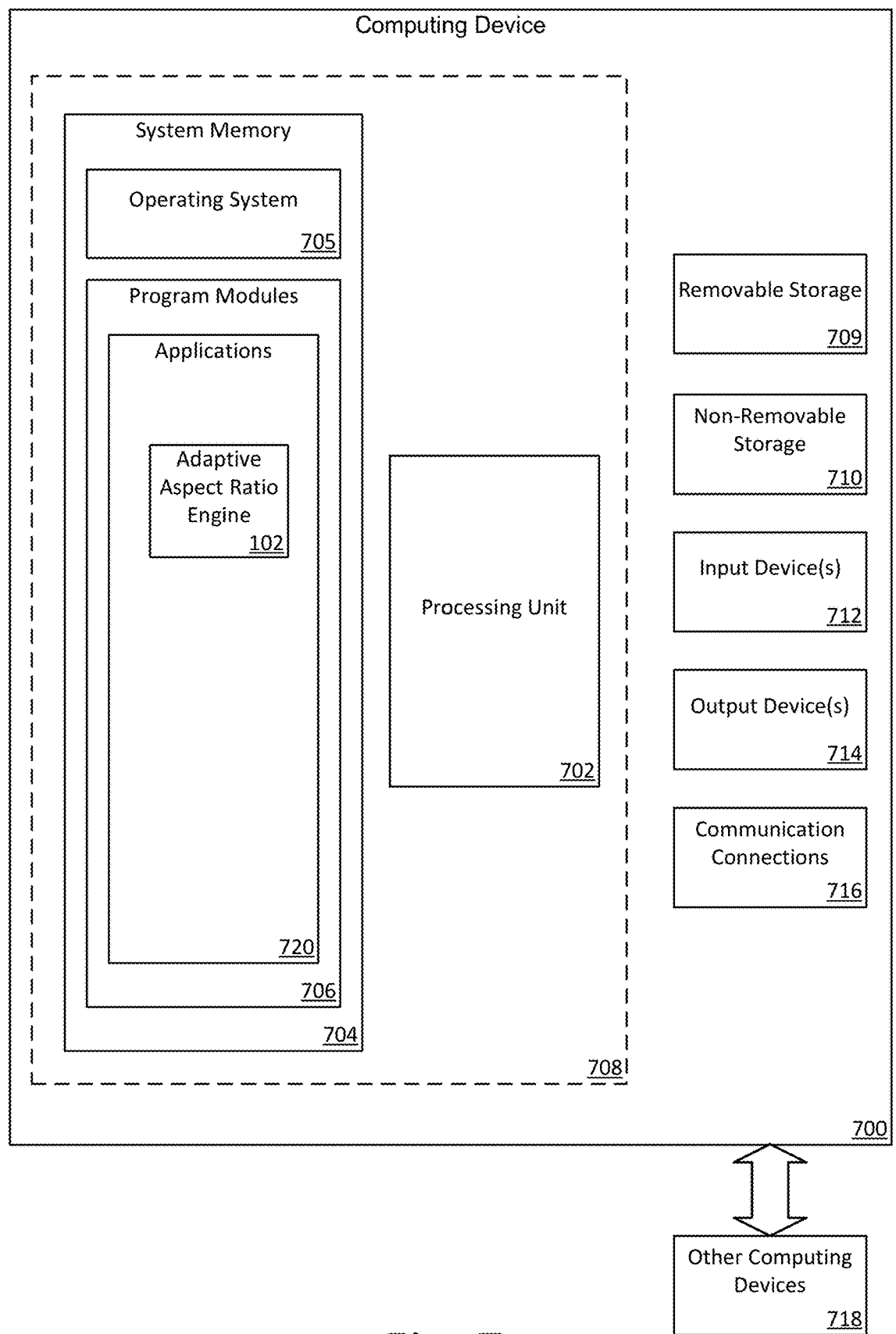
FIG. 7 is a simplified block diagram of an architecture for a computing device with which aspects of the invention may be practiced.
Figure 8A:
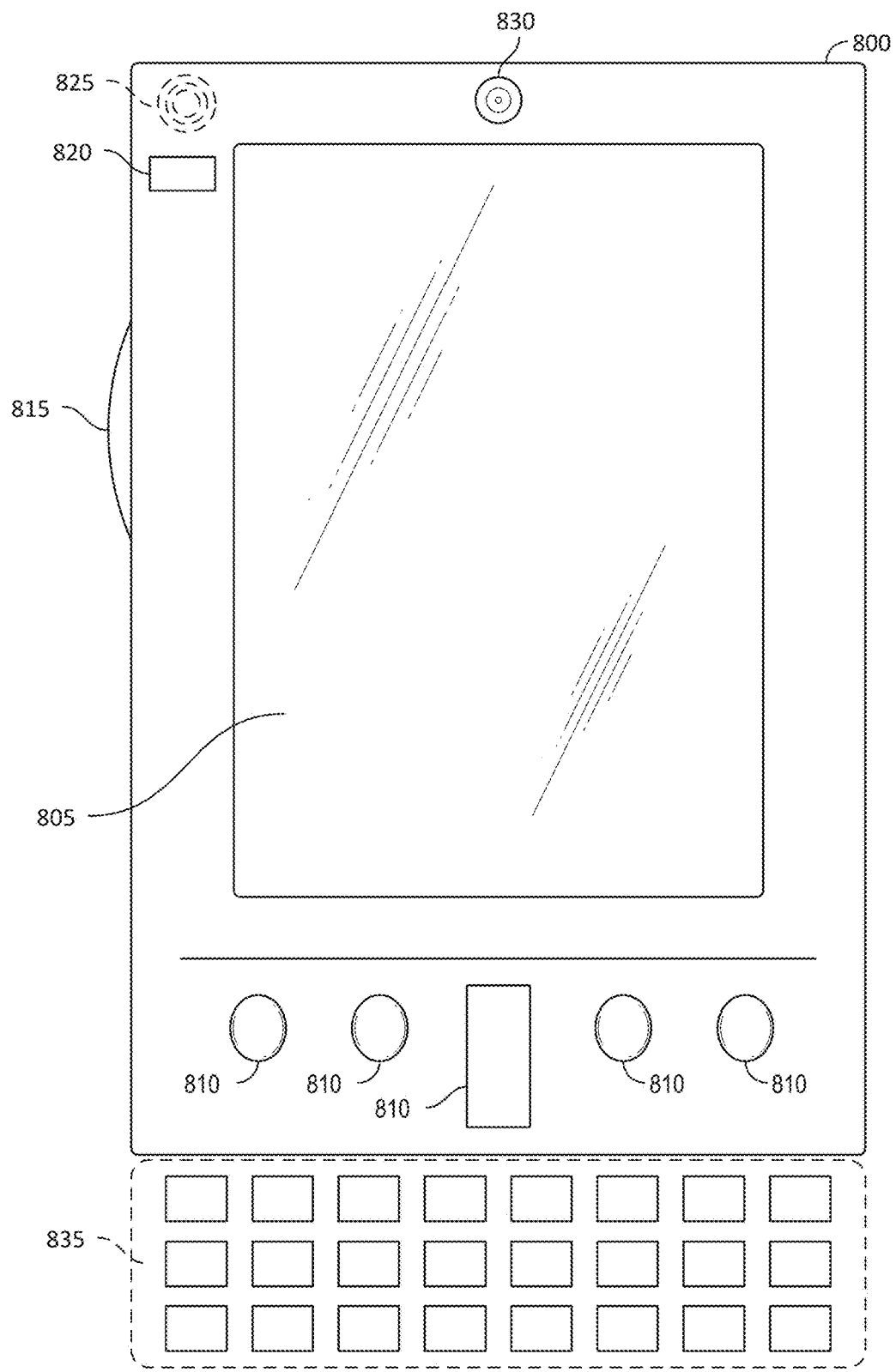
FIG. 8A illustrates a mobile computing device with which aspects of the invention may be practiced.
Figure 8B:
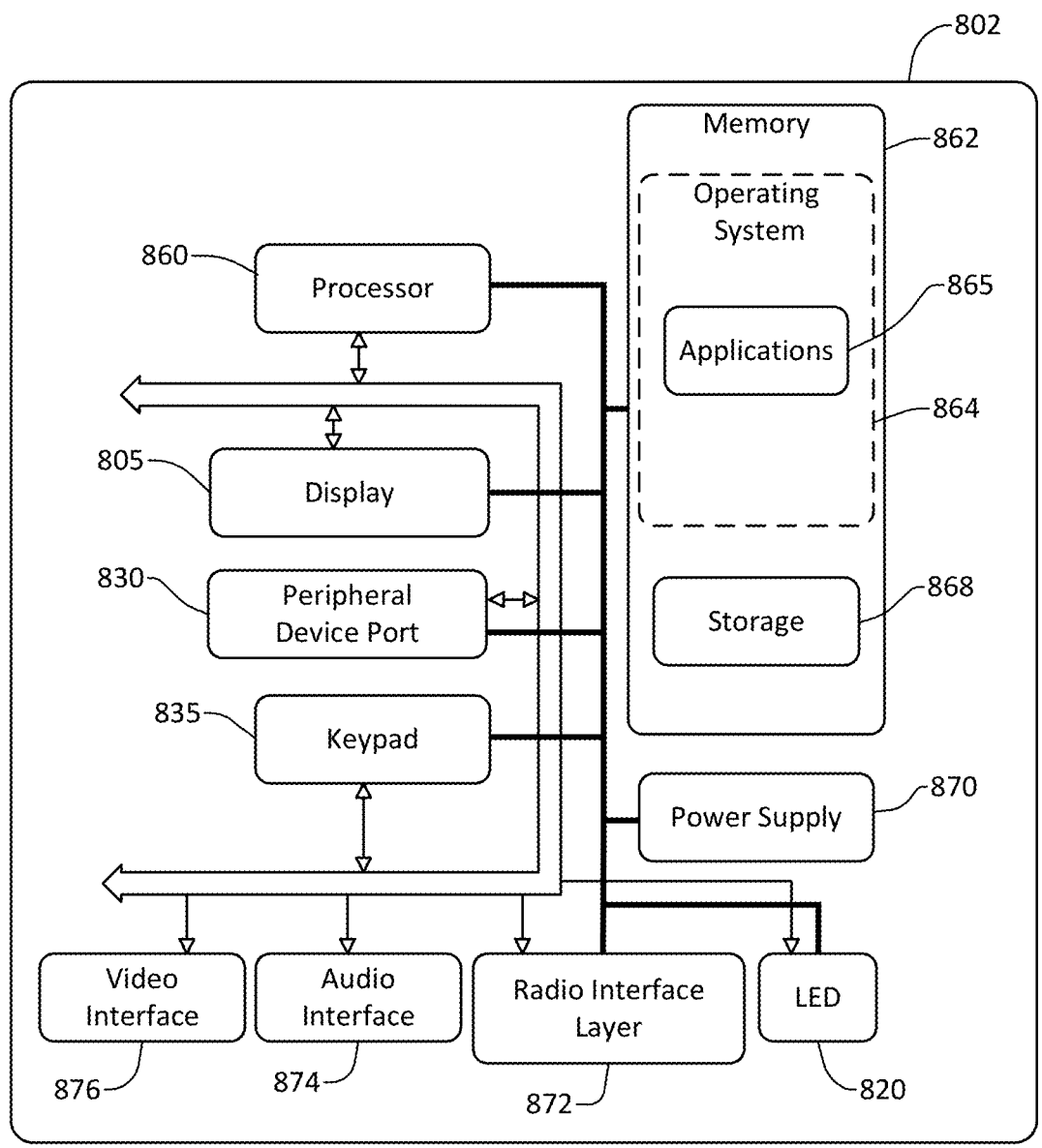
FIG. 8B is a simplified block diagram of an architecture for a mobile computing device with which aspects of the invention may be practiced.
Figure 9:
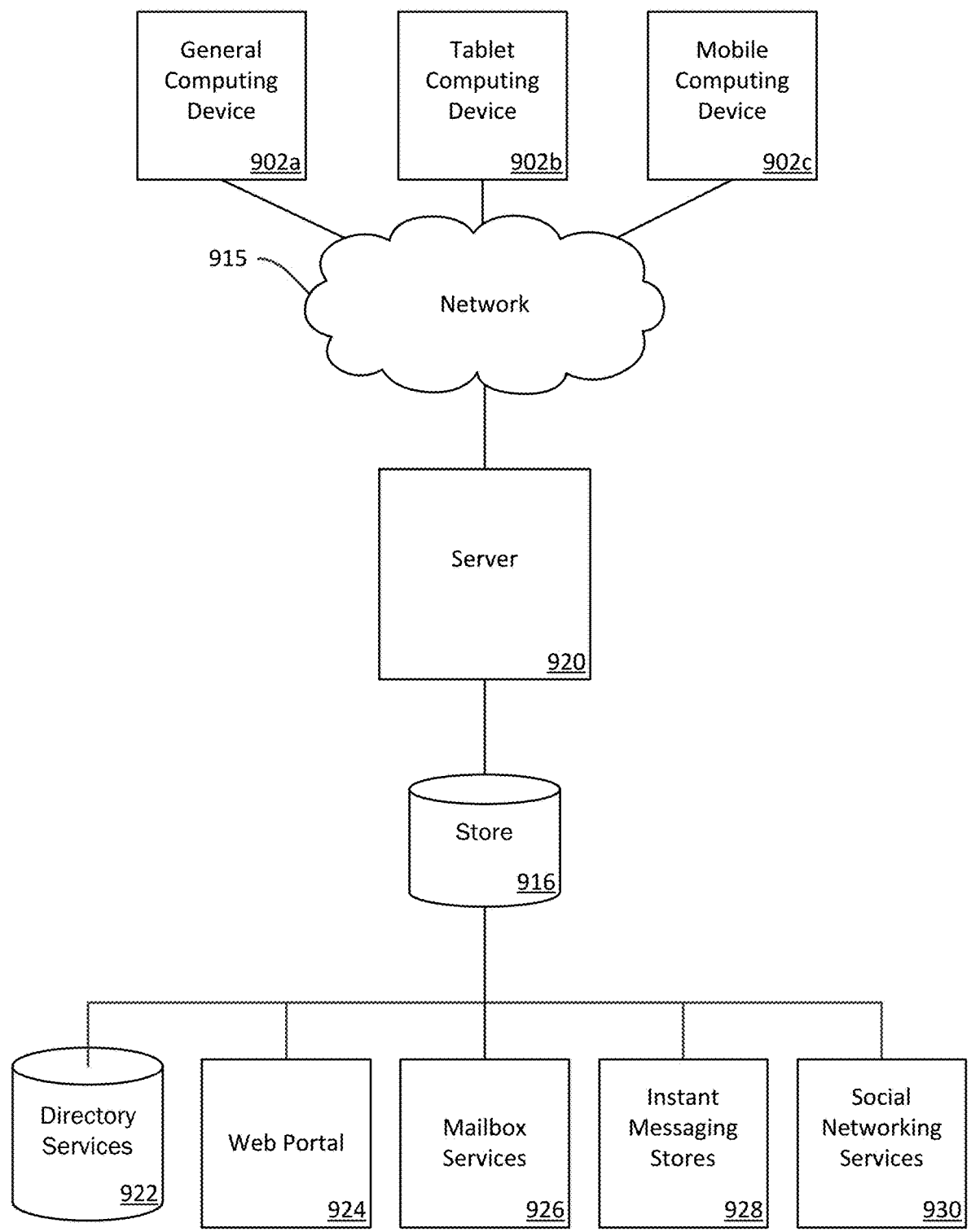
FIG. 9 is a simplified block diagram of a distributed computing system for practicing aspects of the invention.

FIGS. 7 through 9 and the associated descriptions provide a discussion of a variety of operating environments for practicing aspects of the invention. However, the devices and systems illustrated and discussed are for purposes of example and illustration and are not limiting of a vast number of computing device configurations that may be utilized for practicing aspects of the invention described herein.

FIG. 7 is a block diagram of an architecture for a computing device 700 with which aspects of the invention may be practiced. The computing device components described below may be suitable for embodying computing devices including, but not limited to, a personal computer, a tablet computer, a surface computer, and a smart phone, or any other computing device discussed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720 such as the adaptive layout and workflow engine 102. For example, the operating system 705 may be suitable for controlling the operation of the computing device 700. Furthermore, aspects of the invention may be practiced in conjunction with a graphics library, other operating systems, or any other application program and is not limited to any particular application or system. This basic configuration is illustrated by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated by a removable storage device 709 and a non-removable storage device 710.

As stated above, a number of program modules and data files may be stored in the system memory 704. While executing on the processing unit 702, the software applications 720 may perform processes including, but not limited to, one or more of the stages of the method 600. Other program modules that may be used in accordance with aspects of the invention may include electronic mail and contacts applications, word processing applications, spreadsheet applications, database applications, slide presentation applications, or computer-aided drawing application programs, etc.

Furthermore, aspects of the invention may be practiced in an electrical circuit comprising discrete electronic elements, packaged or integrated electronic chips containing logic gates, a circuit utilizing a microprocessor, or on a single chip containing electronic elements or microprocessors. For example, aspects of the invention may be practiced via a system-on-a-chip (SOC) where each or many of the illustrated components may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein with respect to the software applications 720 may be operated via application-specific logic integrated with other components of the computing device 700 on the single integrated circuit (chip). Aspects of the invention may also be practiced using other technologies capable of performing logical operations such as, for example, AND, OR, and NOT, including but not limited to mechanical, optical, fluidic, and quantum technologies. In addition, aspects of the invention may be practiced within a general purpose computer or in any other circuits or systems.

The computing device 700 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all examples of computer storage media (i.e., memory storage). Computer storage media may include random access memory (RAM), read only memory (ROM), electrically erasable read-only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700.

FIG. 8A illustrates a mobile computing device 800 with which aspects of the invention may be practiced. Examples of suitable mobile computing devices include, but are not limited to, a mobile telephone, a smart phone, a tablet computer, a surface computer, and a laptop computer. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. The mobile computing device 800 may incorporate more or less input elements. For example, the display 805 need not be a touch screen. The mobile computing device 800 may also include an optional keypad 835. Optional keypad 835 may be a physical keypad or a "soft" keypad generated on the touch screen display. The output elements include the display 805 for showing a graphical user interface, a visual indicator 820 (e.g., a light emitting diode), and/or an audio transducer 825 (e.g., a speaker). The mobile computing device 800 may incorporate a vibration transducer for providing the user with tactile feedback. The mobile computing device 800 may incorporate input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating an architecture of for a mobile computing device with which aspects of the invention may be practiced. As an example, the mobile computing device 800 may be implemented in a system 802 such as a smart phone capable of running one or more applications (e.g., browsers, e-mail clients, notes, contact managers, messaging clients, games, and media clients/players).

One or more application programs 865 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 865 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including software applications 720 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the outside world via a communications carrier service provider, or a privately owned network. Transmissions to and from the radio 872 are conducted under control of the operating system 864. In other words, communications received by the radio 872 may be disseminated to the application programs 865 via the operating system 864, and vice versa.

The visual indicator 820 may be used to provide visual notifications, and/or an audio interface 874 may be used for producing audible notifications via the audio transducer 825. As shown, the visual indicator 820 may be a light emitting diode (LED) and the audio transducer 825 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. The microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

FIG. 9 is a simplified block diagram of a distributed computing system for practicing aspects of the invention. Content developed, interacted with, or edited in association with the software applications 720 may be stored in different communication channels or other storage types. For example, various documents may be stored using a directory service 922, a web portal 924, a mailbox service 926, an instant messaging store 928, or a social networking site 930. The software applications 720 may use any of these types of systems or the like for enabling data utilization, as described herein. A server 920 may provide the software applications 720 to clients. As one example, the server 920 may be a web server providing the software applications 720 over the web. The server 920 may provide the software applications 720 over the web to clients through a network 915. By way of example, the client computing device may be implemented as the computing device 700 and embodied in a personal computer 902*a*, a tablet computer 902*b*, and/or a mobile computing device (e.g., a smart phone) 902*c*. Any of these client devices may obtain content from the store 916.

The description and illustration of one or more embodiments provided in this application are intended to provide a complete thorough and complete disclosure the full scope of the subject matter to those skilled in the art and not intended to limit or restrict the scope of the invention as claimed in any way. The embodiments, examples, and details provided in this application are considered sufficient to convey possession and enable those skilled in the art to practice the best mode of claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternatives falling within the spirit of the broader aspects of the general inventive concept embodied in this application that do not depart from the broader scope of the claimed invention.

What is claimed is:

1. A method for immersive document interaction with device-aware scaling, the method comprising the acts of:
    providing, to a client device, an initial content item containing an attachment;
    receiving, from the client device, a request to interact with the attachment;
    when the request is received, determining a display configuration associated with a display of the client device;

selecting a layout based on the display configuration, the layout comprising at least:
  a first control that, when actuated, performs a first action;
  a second control that, when actuated, performs a second action; and
  a region to present the attachment;
generating, based on the first control and the second control, a single customized task control to interact with the attachment that, with a single actuation, performs a sequence of multiple actions applicable to at least one of the attachment and the initial content item, the sequence of multiple actions comprising performing at least the first action and the second action;
adapting the layout to further comprise the generated single customized task control; and
providing the layout to the client device for display in response to the received request.

2. The method of claim 1, wherein the display configuration comprises at least one of a resolution, a dots per inch, a pixels per inch, an orientation, an aspect ratio, or a physical size for the display of the client.

3. The method of claim 1, wherein the act of selecting the layout further comprises the act of selecting a full screen view for the layout to use for presenting the attachment when the attachment is a document with a width that is large relative to the width of the display.

4. The method of claim 1, wherein the act of selecting the layout further comprises the act of selecting a full screen view for the layout to use for presenting the attachment when the display is width constrained.

5. The method of claim 1, wherein the act of selecting the layout further comprises the act of selecting a side-by-side view for the layout to use for presenting the attachment when the attachment is a document with a size that is small relative to the width of the display.

6. The method of claim 1, wherein the act of selecting the layout further comprises the act of selecting a side-by-side screen layout for the layout to use for presenting the attachment when the display is not width constrained.

7. The method of claim 1, further comprising the act of providing, to the client device, a layout control allowing selection of an alternate layout to override the selected layout.

8. The method of claim 1, wherein the sequence of multiple actions of the single customized task control is further based on a predicted task for the user.

9. The method of claim 1, wherein adapting the layout to comprise the generated single customized task control comprises omitting the first control and the second control from the layout.

10. The method of claim 1, wherein the sequence of multiple actions of the single customized task control is further based on at least one of a type of the attachment and a previous action taken with the attachment.

11. The method of claim 1, wherein the initial content item is an email message and the attachment is opened for editing, and wherein the first action comprises saving the attachment as a revised attachment and the second action comprises attaching the revised attachment to a new email message.

12. A system for immersive document interaction with device-aware scaling, the system comprising:
  a computing device operable to run a first application to interact with an initial content item and a second application to interact with an attachment, wherein the initial content item contains the attachment;
  an adaptive layout and workflow engine operable to:
    i) collect a display configuration associated with a client device;
    ii) generate a display of the initial content item;
    iii) receive a request to display the attachment of the initial content item;
    iv) when the request is received, determine a view based on the display configuration, wherein the view is one of a full-screen view or a side-by-side view;
    v) generate a display of the attachment using the determined view;
    vi) generate, in the determined view, a display of a single context-sensitive task control that, with a single actuation, performs a sequence of multiple actions applicable to at least one of the attachment and the initial content item in response to the single actuation, the sequence of multiple actions comprising at least:
      a first action associated with a first control; and
      a second action associated with a second control; and
    vii) perform at least the sequence of multiple actions when the single context-sensitive task control is actuated.

13. The system of claim 12, further operable to render a layout control allowing selection of an alternate view to override the determined view.

14. The system of claim 12, wherein the first application is an email application, the second application is an attachment editing application, and the determined view is a full screen view, and wherein the first action and the second action are each selected from a group of actions comprising:
  generating a new email message;
  saving the attachment as a revised attachment;
  attaching the revised attachment to the new email message; and
  opening the new email message for editing.

15. The system of claim 12, wherein the first application is an email application, the initial content item is an email, the second application is a viewer for a read-only attachment, and the determined view is a full screen view, and wherein the first action comprises closing the attachment and the second action comprises generating a new email based on the initial content item.

16. The system of claim 12, wherein the adaptive layout and workflow engine is further operable to determine the full screen view as the view when the display configuration corresponds to a low aspect ratio.

17. The system of claim 12, wherein the adaptive layout and workflow engine is further operable to determine the side-by-side view as the view when the display configuration corresponds to a large aspect ratio.

18. The system of claim 12, wherein the attachment is opened for viewing, and wherein the adaptive layout and workflow engine is operable to display a second single context-sensitive task control for redistributing the attachment.

19. The system of claim 12, wherein the initial content item is an email, and wherein the adaptive layout and workflow engine is further operable to render a new email based on the initial content item and the attachment in a side-by-side view.

20. A computer storage hardware device storing computer executable instructions that, when executed by a computer, perform a method of immersive document interaction with device-aware scaling, the method comprising:
  providing, to a client device, an initial content item containing an attachment;

receiving, from the client device, a request to interact with the attachment;
when the request is received, determining a display configuration of the client device presenting the initial content item via a display;
selecting a layout based on the display configuration, the layout comprising at least:
 a first control that, when actuated, performs a first action;
 a second control that, when actuated, performs a second action; and
 a region to present the attachment;
generating, based on the first control and the second control, a single customized task control to interact with the attachment that, with a single actuation, automatically performs a sequence of multiple actions based at least in part on the display configuration, and wherein the sequence of multiple actions comprises at least the first action and the second action;
adapting the selected layout to further comprise the generated single customized task control; and
providing the layout to the client device for display in response to the received request.

* * * * *